(12) United States Patent
Mou et al.

(10) Patent No.: US 11,865,900 B2
(45) Date of Patent: Jan. 9, 2024

(54) METHOD FOR PREVENTING AND HANDLING IN-CAR AIR POLLUTION

(71) Applicant: MICROJET TECHNOLOGY CO., LTD., Hsinchu (TW)

(72) Inventors: Hao-Jan Mou, Hsinchu (TW); Ching-Sung Lin, Hsinchu (TW); Chin-Chuan Wu, Hsinchu (TW); Yung-Lung Han, Hsinchu (TW); Chi-Feng Huang, Hsinchu (TW); Tsung-I Lin, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 212 days.

(21) Appl. No.: 17/477,600

(22) Filed: Sep. 17, 2021

(65) Prior Publication Data

US 2022/0194181 A1    Jun. 23, 2022

(30) Foreign Application Priority Data

Dec. 21, 2020   (TW) ................................ 109145351

(51) Int. Cl.
*B60H 3/00* (2006.01)
*B60H 1/00* (2006.01)
*B60H 3/06* (2006.01)

(52) U.S. Cl.
CPC .......... *B60H 3/0085* (2013.01); *B60H 1/008* (2013.01); *B60H 1/00849* (2013.01); *B60H 2003/0683* (2013.01)

(58) Field of Classification Search
CPC .......... B60H 3/0085; B60H 2003/0683; B60H 1/00849; B60H 1/008

(Continued)

(56) References Cited

U.S. PATENT DOCUMENTS 10,682,895 B2    6/2020  Mathiasson et al.
2007/0243808 A1*  10/2007  Mathur ................ B60H 3/0085
                                                454/75

(Continued)

FOREIGN PATENT DOCUMENTS

CN          104760490 A       7/2015
CN          204870438 U      12/2015

(Continued)

*Primary Examiner* — Ko-Wei Lin
(74) *Attorney, Agent, or Firm* — McClure, Qualey & Rodack, LLP

(57) ABSTRACT

A method for preventing and handling in-car air pollution includes providing an out-car gas detector to detect a polluted gas outside a car and transmit an out-car gas detection data; providing an in-car gas detector to detect a polluted gas in an interior space of the car and transmit an in-car gas detection data; providing an in-car gas exchange system for controlling and determining whether to introduce a gas outside the car into the interior space, where the in-car gas exchange system includes a cleaning unit for filtering and purifying the polluted gas in the interior space and a control driving unit for receiving and comparing the out-car gas detection data with the in-car gas detection data; and filtering and exchanging the polluted gas in the interior space after the control driving unit compares the out-car gas detection data with the in-car gas detection data.

21 Claims, 18 Drawing Sheets

(58) Field of Classification Search
USPC .......................................... 454/75, 156, 158
See application file for complete search history.

(56) References Cited

U.S. PATENT DOCUMENTS

| | | | | |
|---|---|---|---|---|
| 2015/0309582 | A1* | 10/2015 | Gupta | G06F 3/011 |
| | | | | 345/156 |
| 2016/0236534 | A1* | 8/2016 | Dal Vecchio | B60H 1/3233 |
| 2017/0370604 | A1* | 12/2017 | Carey | F24F 11/58 |
| 2018/0186212 | A1* | 7/2018 | Kundu | A61L 9/015 |
| 2018/0319256 | A1* | 11/2018 | Stahl | B03C 3/41 |
| 2019/0035249 | A1* | 1/2019 | Mou | F24F 11/52 |
| 2019/0160418 | A1* | 5/2019 | Matsumoto | B01D 53/261 |
| 2019/0186768 | A1* | 6/2019 | Edström | B01D 53/0454 |
| 2019/0353378 | A1* | 11/2019 | Ramamurti | G05B 15/02 |
| 2020/0278120 | A1* | 9/2020 | Neal | F24F 11/49 |
| 2020/0346511 | A1* | 11/2020 | Hasegawa | B60H 3/0085 |
| 2021/0300153 | A1* | 9/2021 | Porter | B60H 3/0608 |
| 2022/0120655 | A1* | 4/2022 | Mou | B01D 47/14 |

FOREIGN PATENT DOCUMENTS

| | | | | |
|---|---|---|---|---|
| CN | 105722702 | A | 6/2016 | |
| CN | 207388813 | A | 5/2018 | |
| CN | 207388813 | U | 5/2018 | |
| CN | 108790670 | A | 11/2018 | |
| CN | 109153314 | A | 1/2019 | |
| CN | 109910565 | A | 6/2019 | |
| CN | 110466307 | A | 11/2019 | |
| CN | 110718051 | A | 1/2020 | |
| CN | 111263703 | A | 6/2020 | |
| CN | 111391623 | A | 7/2020 | |
| CN | 111845243 | A | 10/2020 | |
| EP | 3463944 | B1 | 11/2020 | |
| FR | 3070315 | A1 | 3/2019 | |
| KR | 20180028174 | A * | 3/2018 | |
| TW | M324609 | U | 1/2008 | |
| TW | M508454 | U | 9/2015 | |
| WO | WO-2019082395 | A1 * | 5/2019 | ......... B60H 1/00785 |

* cited by examiner

METHOD FOR PREVENTING AND HANDLING IN-CAR AIR POLLUTION

CROSS-REFERENCE TO RELATED APPLICATION

This non-provisional application claims priority under 35 U.S.C. § 119(a) to Patent Application No. 109145351 filed in Taiwan, R.O.C. on Dec. 21, 2020, the entire contents of which are hereby incorporated by reference.

BACKGROUND

Technical Field

The present disclosure relates to a method of performing gas exchange for polluted gas in an interior space of a car, in particular, to a method for preventing and handling in-car air pollution.

Related Art

With the growths of global population and rapid developments of industry, the air quality is gradually deteriorating, and people are exposed to the harmful air pollutants for a long time, which is not only harmful to human health but also life-threatening in various serious cases.

There are many pollutants in the air, such as carbon dioxide, carbon monoxide, formaldehyde, bacteria, fungi, volatile organic compounds (VOC), particulate matters, or ozone. When the concentration of pollutants increases, it will seriously harm the human body. In the case of particulate matters, such small and fine particulates will penetrate alveoli, enter the blood vessels, and flow throughout the body with the blood circulation. As a result, they not only might be harmful to the respiratory tract, but also might result in cardiovascular diseases and/or increase the risks of inducing cancers.

Currently, with the prevailing of epidemic diseases such as influenza and pneumonia threatening people's health, social activities are restricted and discourage people from taking public transportation. Therefore, driving their own cars becomes people's first choice of transportation when they need to go out. Consequently, how to ensure that the gas in the car is clean and breathable anytime becomes an important issue of concern to be addressed and solved.

SUMMARY

One object of the present disclosure is to provide a method for preventing and handling in-car air pollution. One object of the method is to provide an in-car gas exchange system including an air-conditioning unit, a cleaning unit, and a control driving unit. The air-conditioning unit is provided to adjust the temperature and the humidity of interior space of a car based on the out-car detection data and the in-car detection data. The cleaning unit is provided to introduce, filter, and purify the gas in the cleaning unit, and then guides the purified gas into the interior space of the car. The control driving unit is provided to receive the out-car detection data and the in-car detection data, and compare the out-car gas detection data and the in-car gas detection data with an artificial intelligent computation to selectively implement gas exchange for the polluted gas in the interior space of the car or selectively determine whether to introduce the gas outside the car into the interior space of the car to exchange with the polluted gas, such that the polluted gas in the interior space of the car can be exchanged to be a clean, safe, and breathable gas.

In view of above objects, in one embodiment of the present disclosure, a method for preventing and handling in-car air pollution is provided. The method is applicable for dealing with air pollutant by gas exchanging and filtering of a polluted gas in an interior space of a car. The method includes providing an out-car gas detector to detect the polluted gas outside the car and transmit an out-car gas detection data of the gas outside the car; providing an in-car gas detector to detect the polluted gas in the interior space of the car and transmit an in-car gas detection data; providing an in-car gas exchange system for controlling and determining if it is needed to introduce a gas outside the car into the interior space of the car, wherein the in-car gas exchange system includes a cleaning unit and a control driving unit, and wherein the cleaning unit is provided for filtering and purifying the polluted gas in the interior space of the car, and the control driving unit is provided for receiving and comparing the out-car gas detection data and the in-car gas detection data; and an intelligent selection is provided for determination of introducing the gas outside the car by the in-car gas exchange system based on the comparison result between the out-car gas detection data and the in-car gas detection data from the control driving unit, so that the polluted gas in the interior space of the car can be filtered and exchanged out of the car, thereby allowing the polluted gas in the interior space of the car to be exchanged and filtered to be a clean, safe, and breathable gas.

BRIEF DESCRIPTION OF THE DRAWINGS

The disclosure will become more fully understood from the detailed description given herein below, for illustration only and thus not limitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Please refer to FIG. 1 to FIG. 12B. A method for preventing and handling in-car air pollution is provided. The method is applicable for dealing with air pollutant by gas exchanging and filtering of a polluted gas. The method includes following steps.

Figure 1:
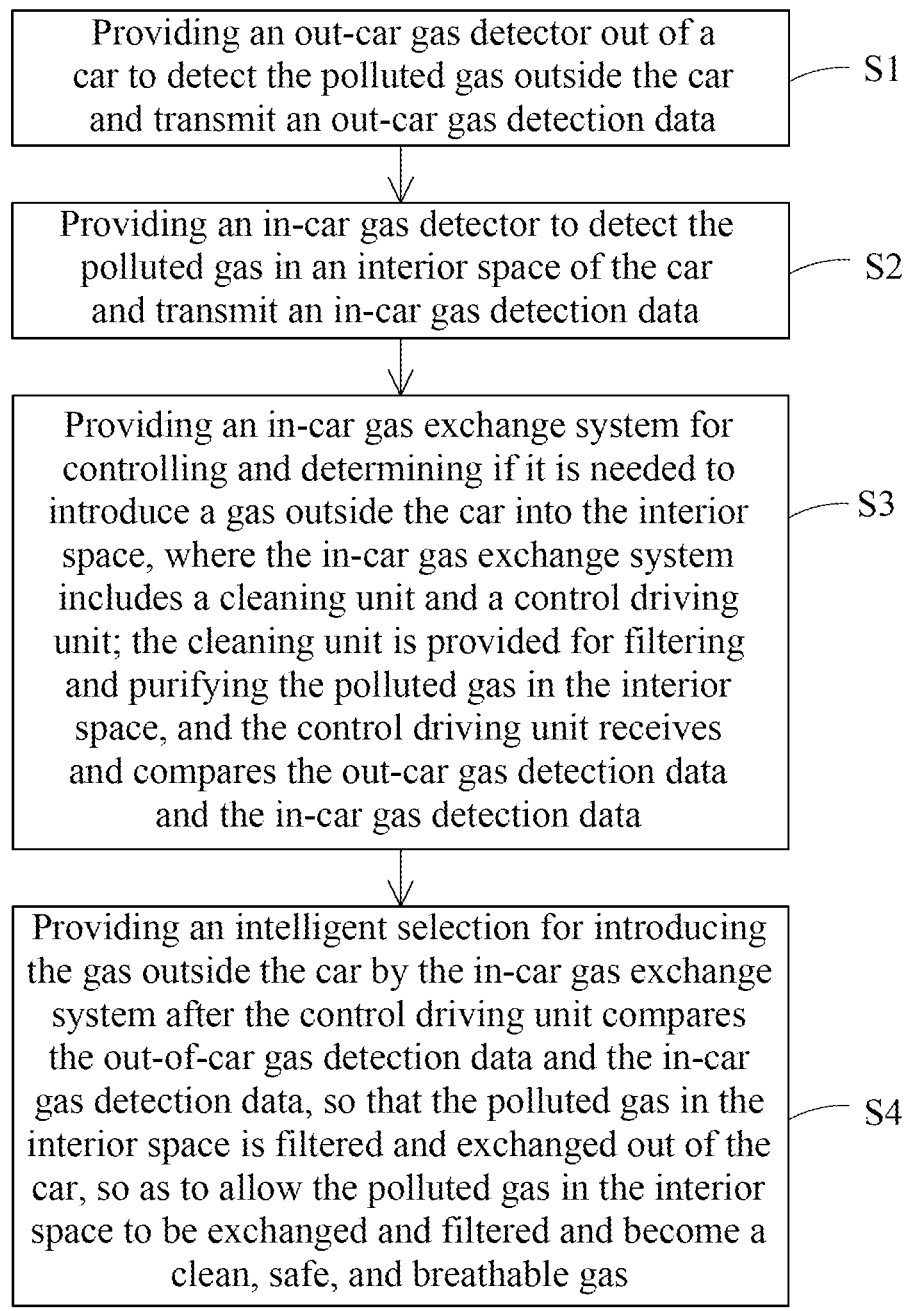
FIG. 1 illustrates a schematic flowchart of a method for preventing and handling in-car air pollution according to an exemplary embodiment of the present disclosure.
Figure 2A:
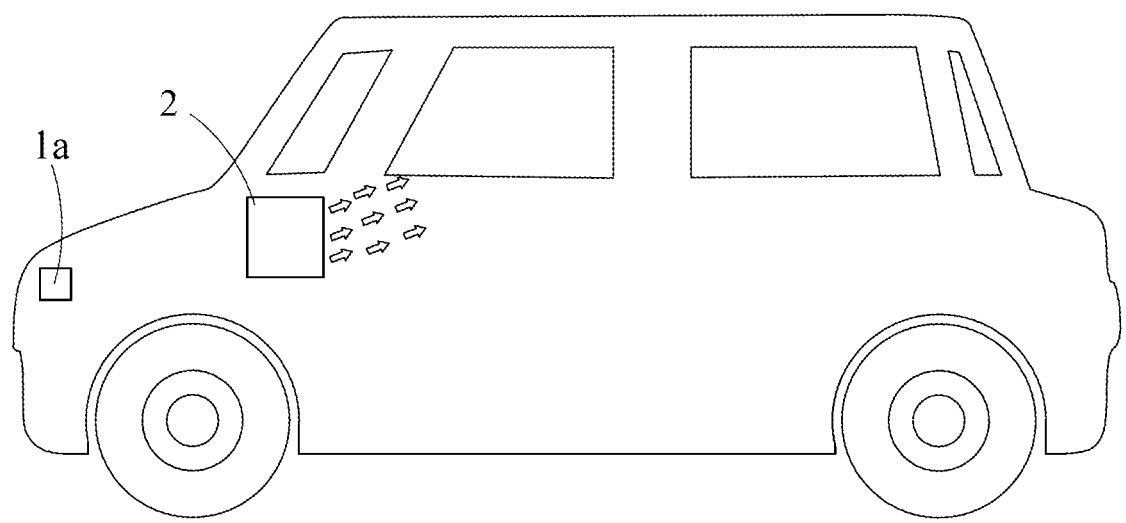
FIG. 2A illustrates a schematic view showing a car applicable to the method for preventing and handling in-car air pollution shown in FIG. 1.

Firstly, the step S1 provides an out-car gas detector 1a out of a car to detect the polluted gas outside the car and transmit an out-car gas detection data. As shown in FIG. 2A, the out-car gas detector 1a is disposed outside the car. The out-car gas detector 1a includes a gas detection module for detecting the polluted gas outside the car and transmitting an out-car gas detection data.

Figure 2B:
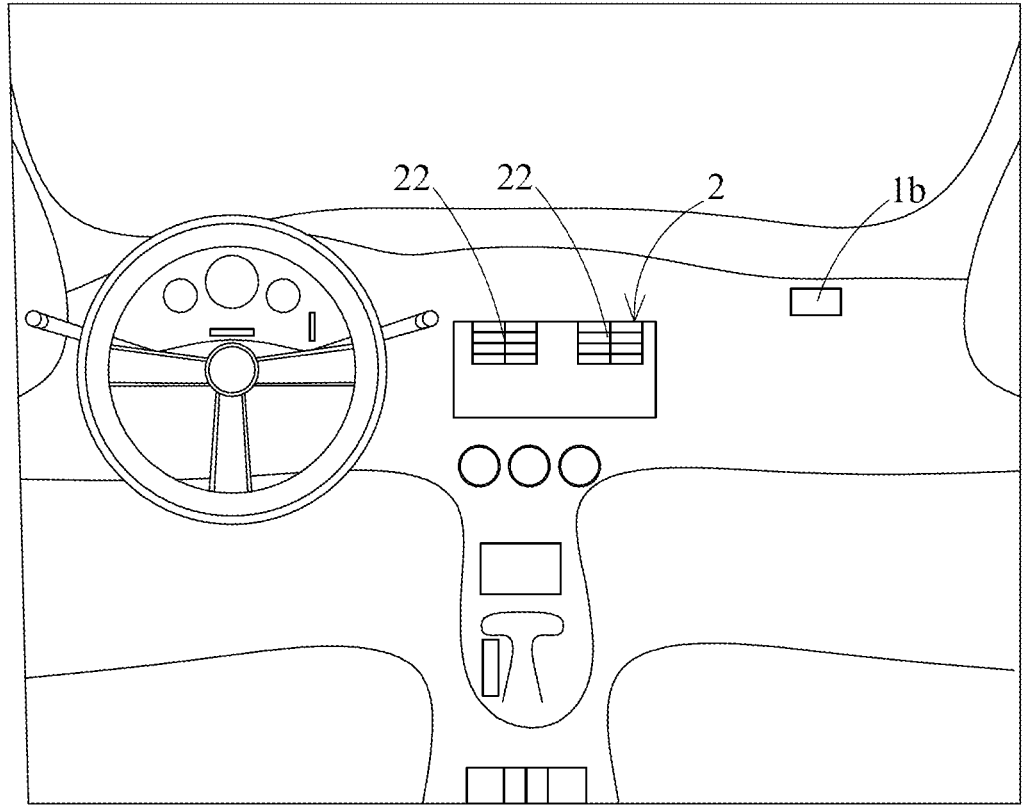
FIG. 2B illustrates a schematic internal structural view of the car shown in FIG. 2A.

The step S2 provides an in-car gas detector 1b to detect the polluted gas in the interior space of the car and transmit an in-car gas detection data. As shown in FIG. 2B, the in-car gas detector 1b is placed inside the car. The in-car gas detector 1b includes a gas detection module for detecting the polluted gas in the interior space of the car and transmitting an in-car gas detection data. In this embodiment, the out-car gas detector 1a and the in-car gas detector 1b have the same structure, but not limited thereto.

The step S3 provides an in-car gas exchange system 2 for controlling and determining if it is needed to introduce a gas outside the car into the interior space of the car. The in-car gas exchange system 2 includes a cleaning unit 23 and a control driving unit 25. The cleaning unit 23 is provided for filtering and purifying the polluted gas in the interior space of the car. The control driving unit 25 receives and compares the out-car gas detection data and the in-car gas detection data. As shown in FIG. 2A to FIG. 2E, the in-car gas exchange system 2 has at least one gas inlet 21 and at least one gas outlet 22. The in-car gas exchange system 2 further includes a cleaning unit 23, an air-conditioning unit 24, and a control driving unit 25. The cleaning unit 23 filters and purifies the gas introduced from the at least one gas inlet 21, and the gas is introduced into the interior space of the car from the at least one gas outlet 22. The air-conditioning unit 24 adjusts the temperature and the humidity of the interior space of the car. The control driving unit 25 receives and compares the out-car gas detection data and the in-car gas detection data. Artificial intelligent computation and comparison is provided by the control driving unit 25 to control the enabling and the operation time of the in-car gas exchange system 2. The at least one gas inlet 21 is connected to an inlet channel 211 and comprises an inlet valve 212 for controlling the opening or closing of at least one gas inlet 21, thereby controlling the introduction of the gas outside the car. The at least one gas outlet 22 is connected to a flow-guiding component 221 to allow the at least one gas outlet 22 to discharge the gas. Moreover, the in-car gas exchange system 2 further includes a gas-exchange inlet 26, a gas-exchange channel 27, and a gas-exchange outlet 28. The gas-exchange inlet 27 is connected to the gas-exchange channel 27. The gas-exchange channel 27 is in communication with the gas-exchange outlet 28 and the inlet channel 211 to form a circulating gas flow path. The gas-exchange outlet 28 includes an outlet valve 29 for controlling the opening or closing of the gas-exchange outlet 28, thereby controlling the discharging of the gas from the gas-exchange outlet 28.

The step S4 provides an intelligent selection for introducing the gas outside the car by the in-car gas exchange system 2 after the control driving unit 25 compares the out-car gas detection data and the in-car gas detection data, so that the polluted gas in the interior space of the car is filtered and exchanged out of the car, so as to allow the polluted gas in the interior space of the car to be exchanged and filtered and become a clean, safe, and breathable gas. The control driving unit 25 of the in-car gas exchange system 2 provides an artificial intelligent computation and comparison of the out-car gas detection data and the in-car gas detection data, so as to provides the intelligent selection of determining whether the in-car gas exchange system 2 should introduce the gas outside the car and implement gas filtration and exchange in the interior space of the car. That is, in this embodiment, the control driving unit 25 can select to control the filtration and exchange of the polluted gas in the interior space of the car out of the car directly or select to introduce the gas outside the car into the interior space of the car from the at least one gas inlet 21 to filter and exchange the gas in the interior space of the car. Therefore, the polluted gas in the interior space of the car can be exchanged and filtered to become a clean, safe, and breathable gas.

As described above, in one or some embodiments of the present disclosure, an in-car gas exchange system 2 provides an intelligent selection for gas exchange in the interior space of the car, so that the in-car gas detection data of the polluted gas in the interior space of the car can decrease to a safety detection value, so that the driver can breathe clean and safe gas in the interior space of the car. The devices and the processes of the present disclosure are described in the following paragraphs. In one embodiment, the safety detection value is preset and stored in the control driving unit 25.

The out-car gas detection data and the in-car gas detection data are detected for the polluted gas. The polluted gas may include at least one selected from the group consisting of particulate matters (PM1, PM2.5, PM10), carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, and viruses, but not limited thereto.

Figure 3:
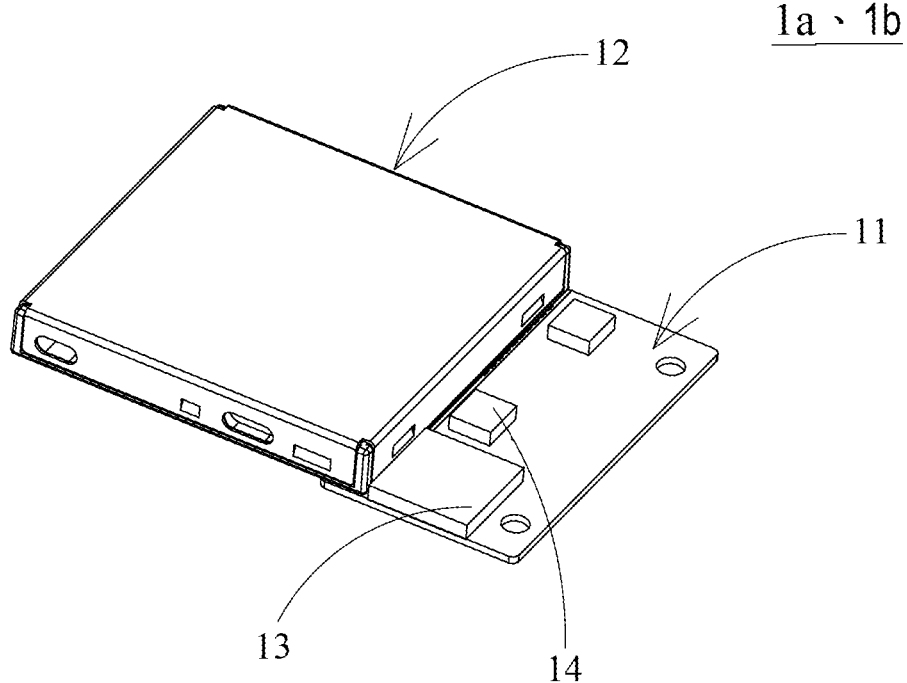
FIG. 3 illustrates a schematic perspective view of a gas detection module according to an exemplary embodiment of the present disclosure.
Figure 4A:
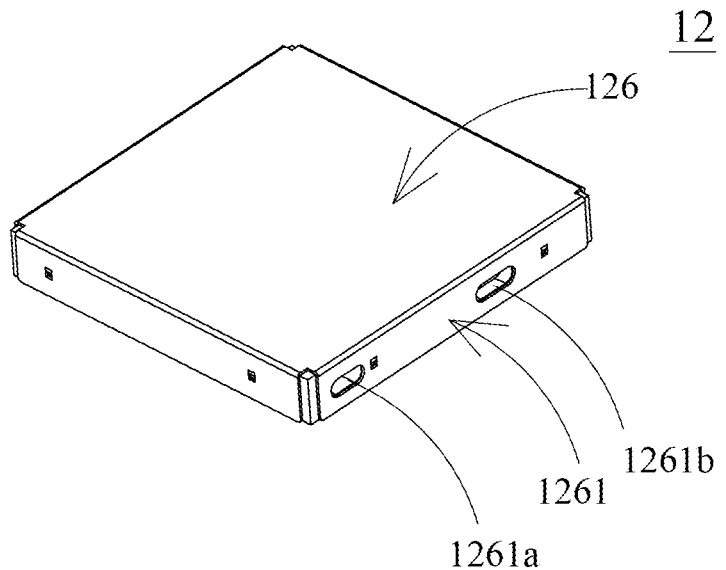
FIG. 4A illustrates a front perspective view of a gas detection main body according to an exemplary embodiment of the present disclosure.
Figure 4B:
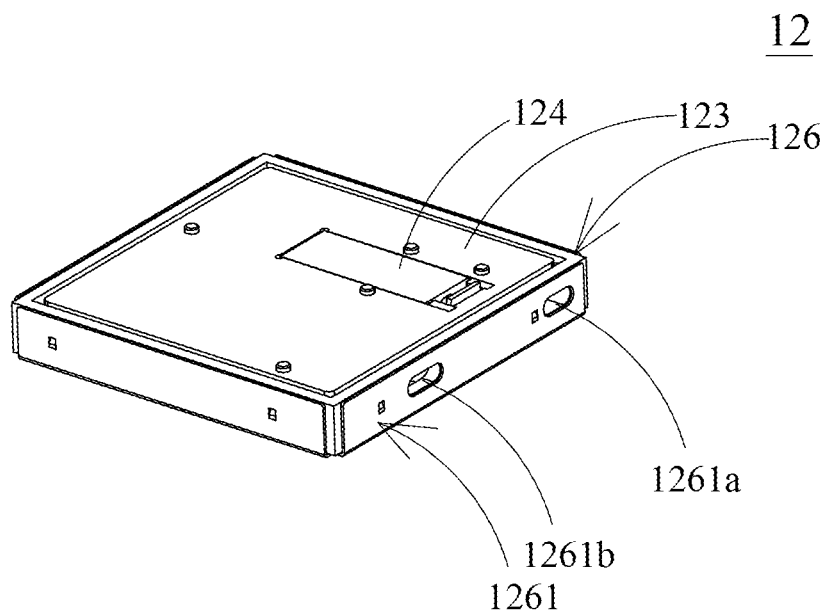
FIG. 4B illustrates a rear perspective view of the gas detection main body of the exemplary embodiment of the present disclosure.
Figure 4C:
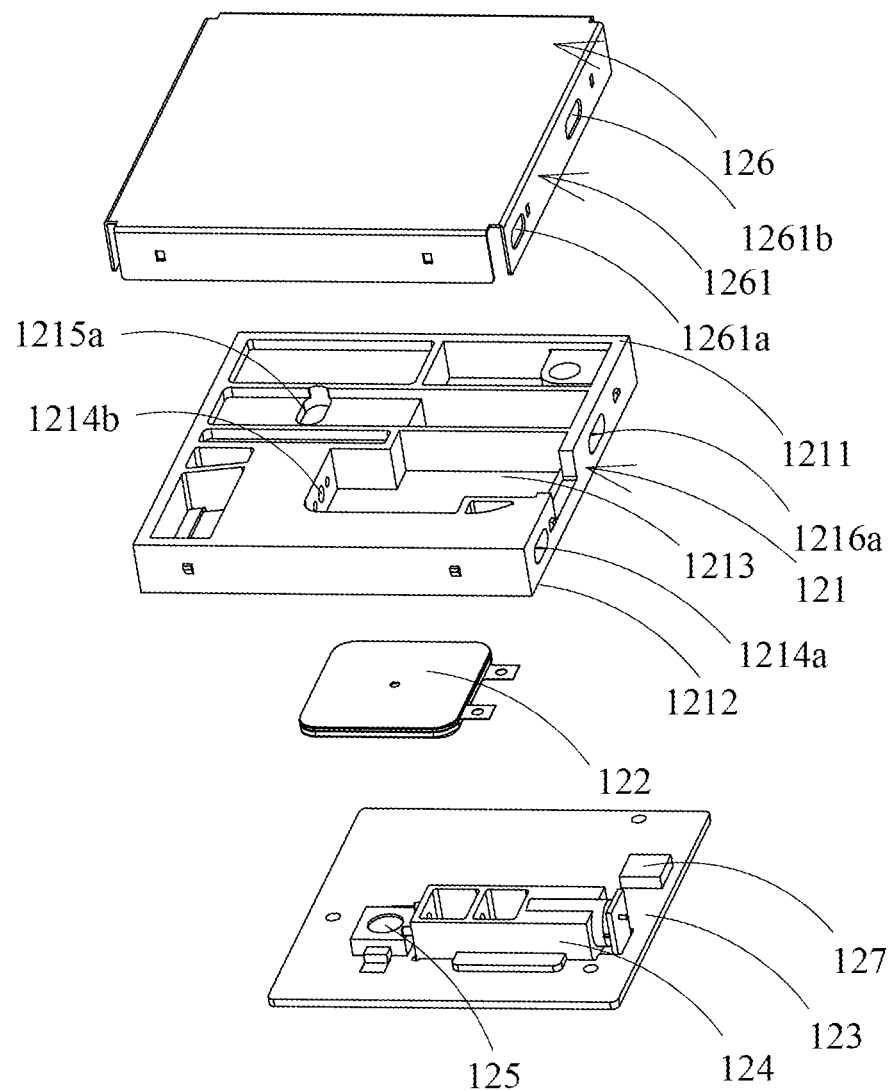
FIG. 4C illustrates an exploded view of the gas detection main body of the exemplary embodiment of the present disclosure.
Figure 5A:
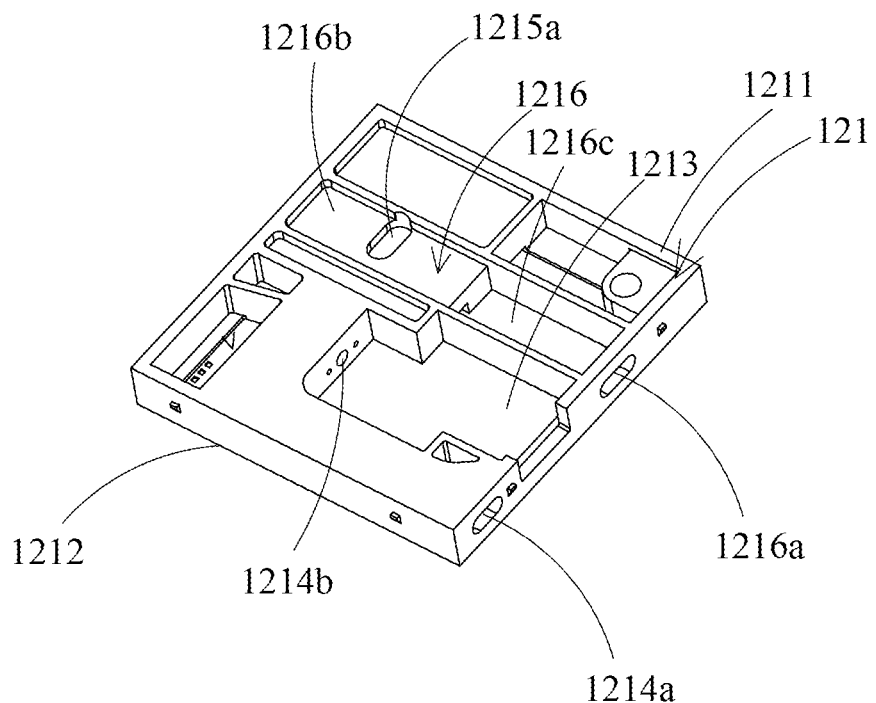
FIG. 5A illustrates a front perspective view of a base according to an exemplary embodiment of the present disclosure.
Figure 5B:
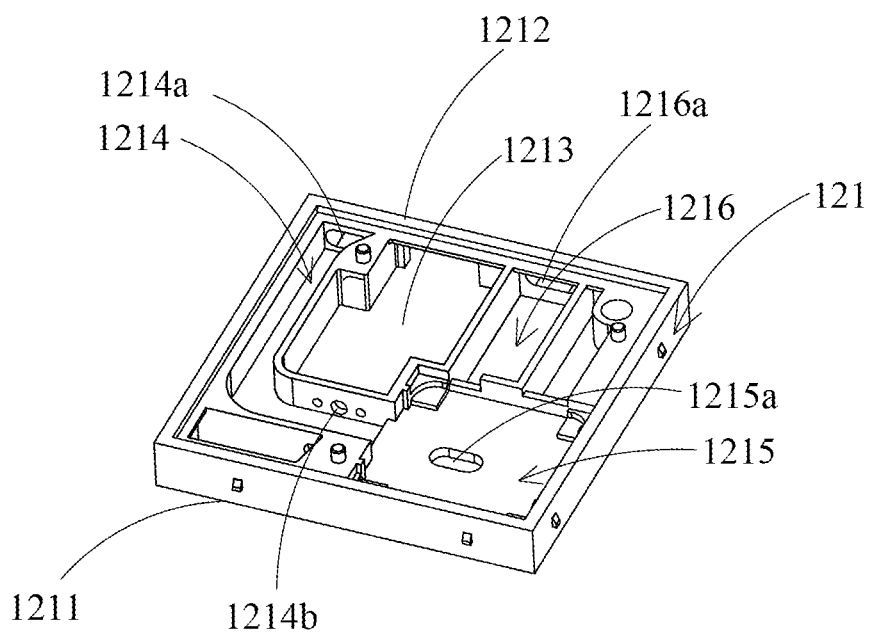
FIG. 5B illustrates a rear perspective view of the base of the exemplary embodiment of the present disclosure.
Figure 6:
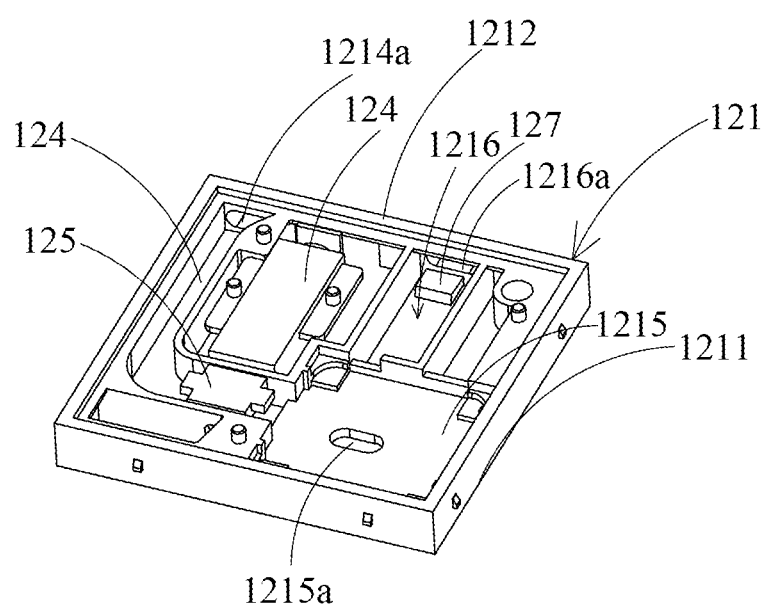
FIG. 6 illustrates a schematic perspective view showing that a laser component is assembled on the base according to the exemplary embodiment of the present disclosure.
Figure 7A:
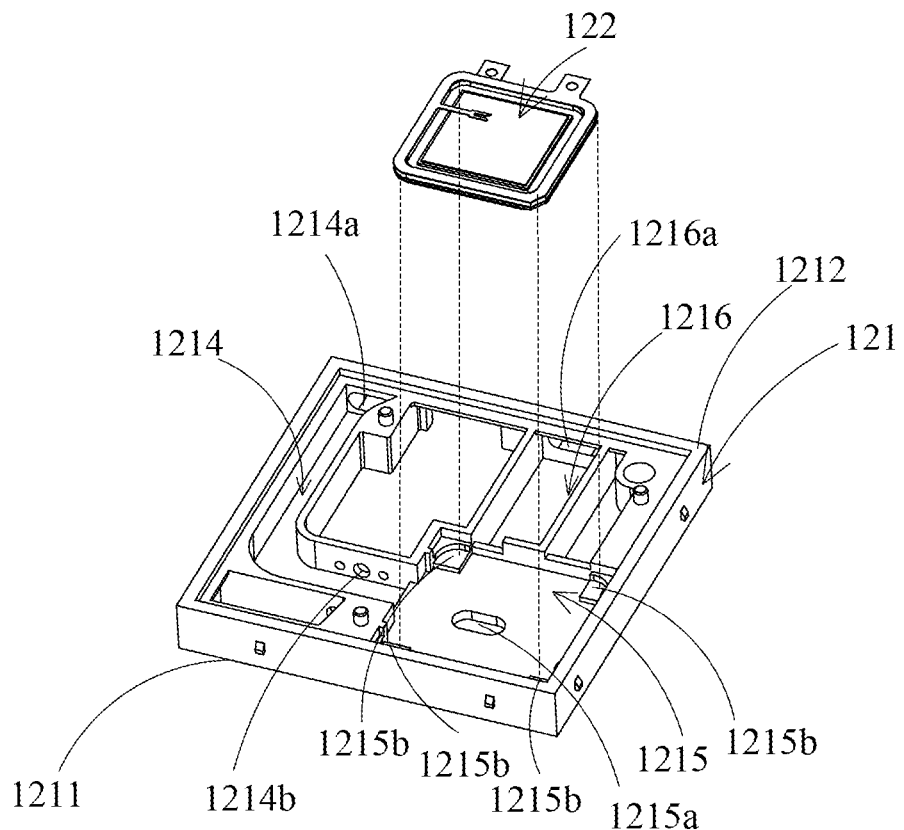
FIG. 7A illustrates an exploded view showing that a piezoelectric actuator is to be disposed in the base according to the exemplary embodiment of the instant disclosure.
Figure 7B:
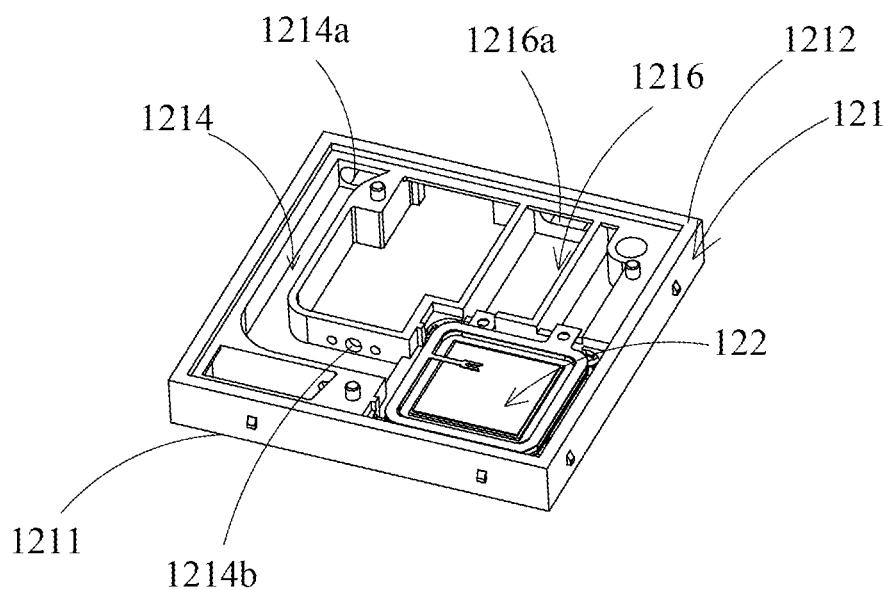
FIG. 7B illustrates a perspective view showing that the piezoelectric actuator is disposed in the base according to the exemplary embodiment of the instant disclosure.
Figure 8A:
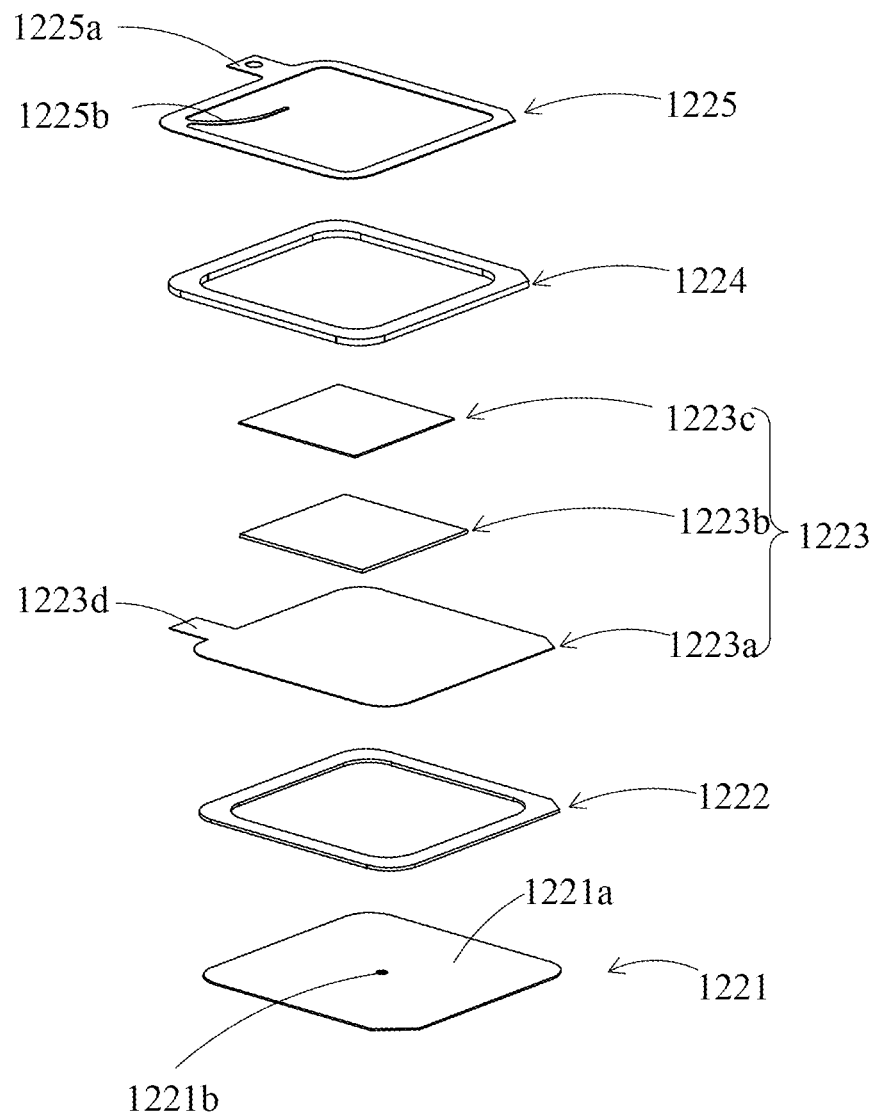
FIG. 8A illustrates a front exploded view of the piezoelectric actuator according to the exemplary embodiment of the present disclosure.
Figure 8B:
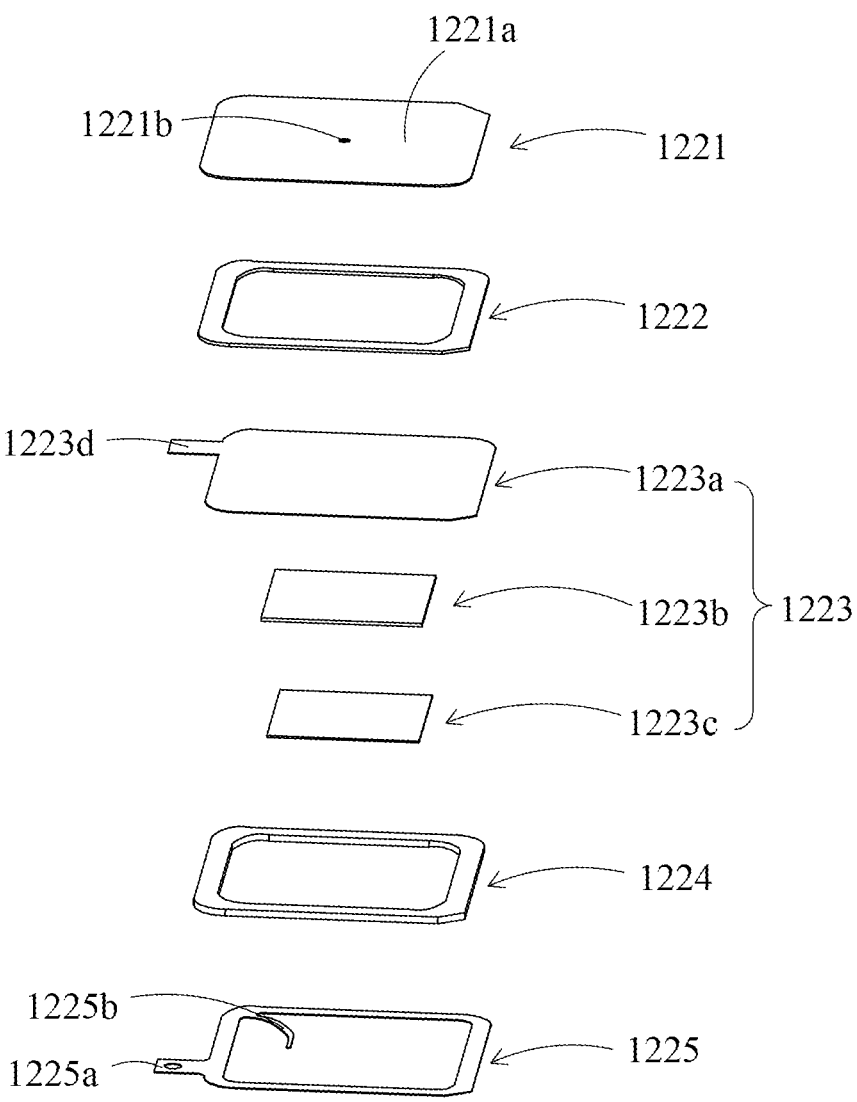
FIG. 8B illustrates a rear exploded view of the piezoelectric actuator according to the exemplary embodiment of the present disclosure.
Figure 12A:
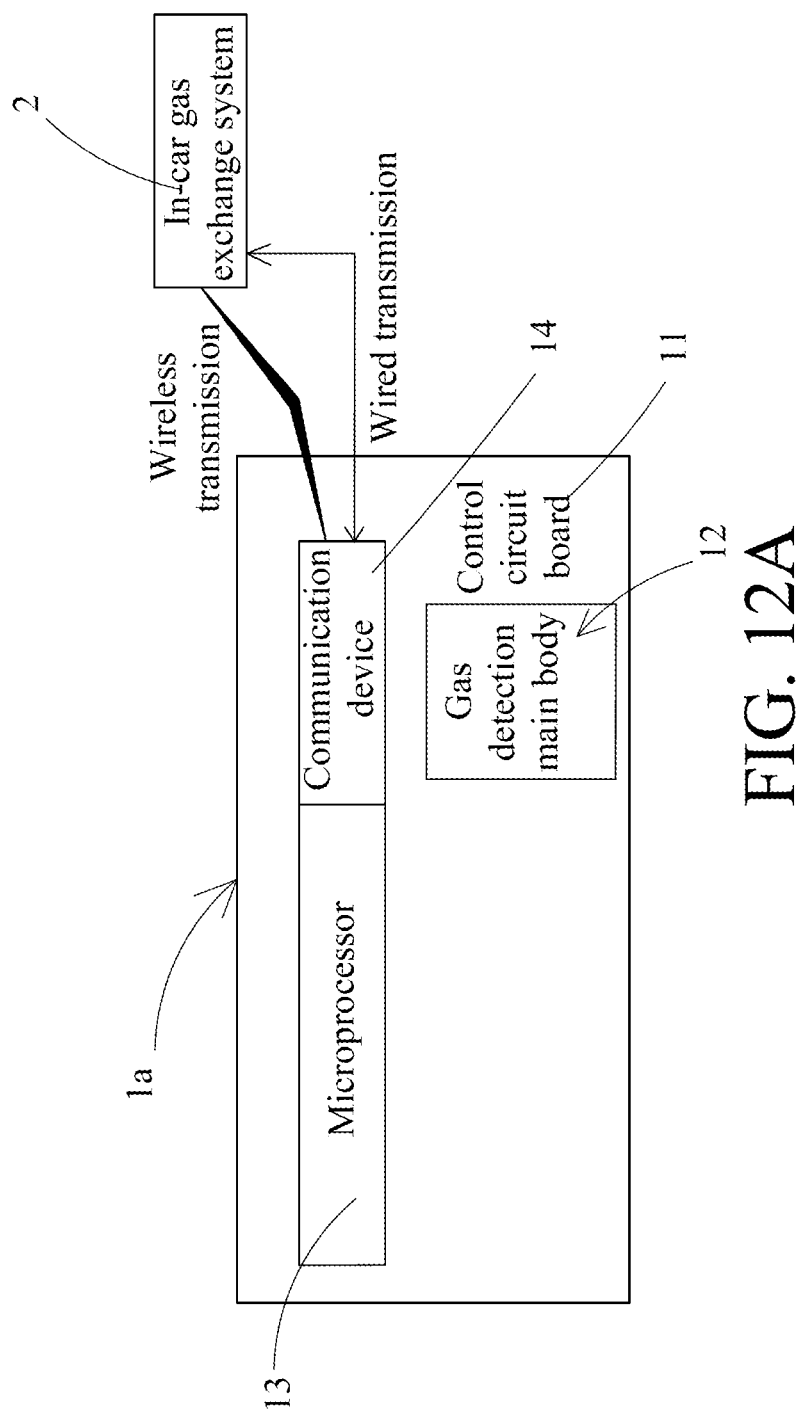
FIG. 12A illustrates a schematic view showing the connection between the out-car gas detector and the in-car gas exchange system.
Figure 12B:
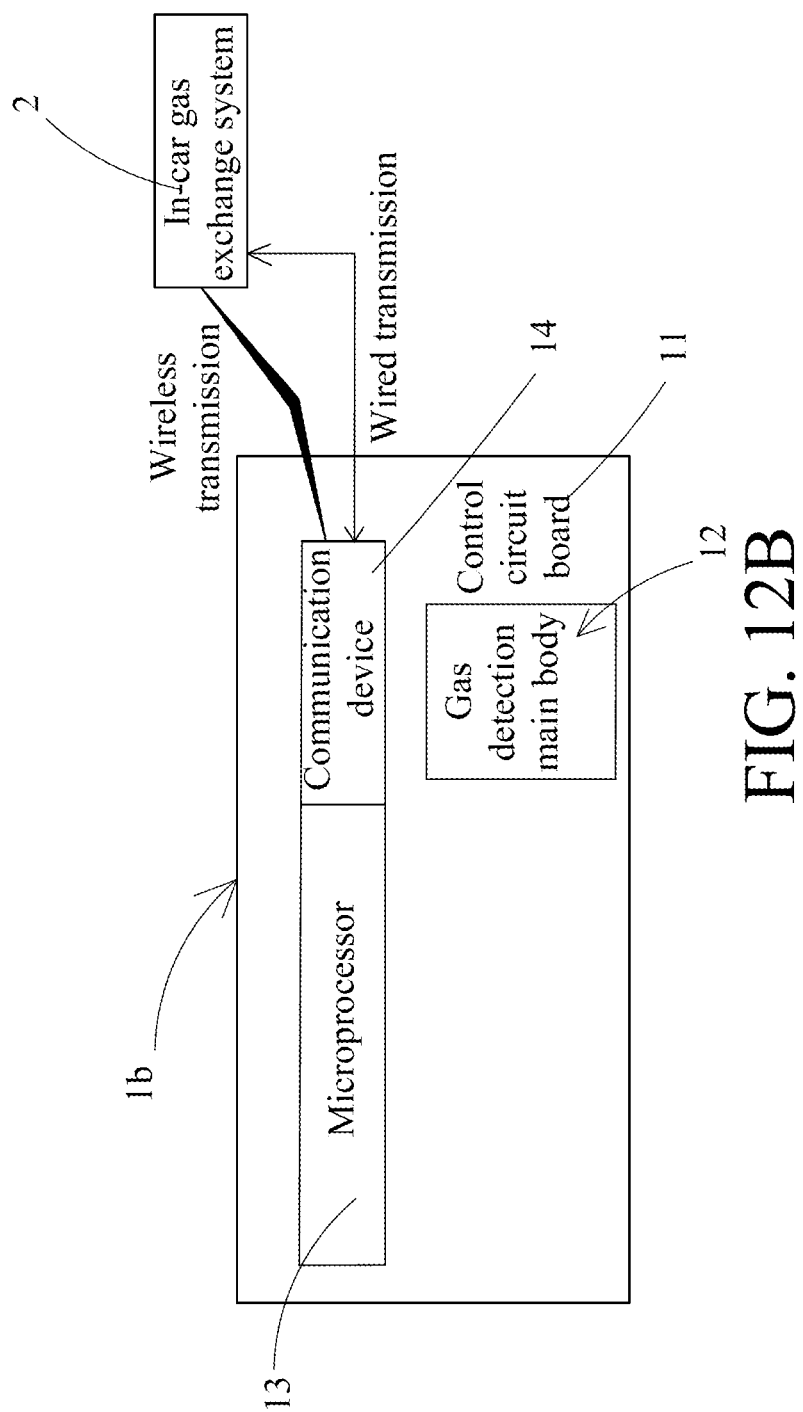
FIG. 12B illustrates a schematic view showing the connection between the in-car gas detector and the in-car gas exchange system.

As shown in FIG. 3 as well as FIG. 12A and FIG. 12B, each of the out-car gas detector 1a and the in-car gas detector 1b further includes a gas detection module. The gas detection module includes a control circuit board 11, a gas detection main body 12, a microprocessor 13, and a communication device 14. The gas detection main body 12, the microprocessor 13, and the communication device 14 are integrally packaged with and electrically connected to the control circuit board 11. The microprocessor 13 and the communication device 14 are disposed on the control circuit board 11. The microprocessor 13 controls the detection and the operation of the gas detection main body 12. The gas detection main body 12 detects the polluted gas and output a detection signal. The microprocessor 13 of the gas detection module of each of the out-car gas detector 1a and the in-car gas detector 1b receives and processes the detection signal and outputs the out-car gas detection data and the in-car gas detection data, respectively. The out-car gas detection data and the in-car gas detection data are further provided to the communication devices 14 for transmitting outwardly. Specifically, in this embodiment, the communication devices 14 can be signally connected to the control driving unit 25 of the in-car gas exchange system 2 and transmit data to the in-car gas exchange system 2. Therefore, the out-car gas detection data and the in-car gas detection data transmitted by the communication devices 14 can be computed and compared by the control driving unit 25 with artificial intelligent to control the enabling and the operation time of the in-car gas exchange system 2, so as to decrease the amount of the polluted gas to the safety detection value by utilizing the cleaning unit 23. The control driving unit 25 further, in an intelligent manner, selects to control the gas exchange for the polluted gas in the interior space of the car out of the car, or selects to determine whether the gas outside the car can be introduced into the interior space of the car to exchange with the polluted gas in the interior space of the car, such that the polluted gas in the interior space of the car can be exchanged to be a clean, safe, and breathable gas. Moreover, in some embodiments, the outwardly communication transmission of the communication devices 14 may be implemented through a wired transmission. For example, the wired transmission may be achieved by a USB port, a mini-USB port, and micro-USB port. The outwardly communication transmission of the communication devices 14 may also be implemented through a wireless transmission. For example, the wireless transmission may be achieved by a Wi-Fi module, a Bluetooth module, a radiofrequency identification module, and a near field communication module.

It is understood that, in the foregoing embodiment, the in-car gas detector 1b is placed in the interior space of the car. The in-car gas detector 1b may be fixed in the interior space of the car (as shown in FIG. 2B); alternatively, the in-car gas detector 1b may be a portable detection device. In one practical embodiment, the in-car gas detector 1b may be a wearable device, such as a watch or a bracelet, which can be worn on a human body (not shown). Therefore, when the user wearing the wearable device sits in the interior space of the car, the wearable device can detect the air pollution condition of the interior space of the car and transmit the in-car gas detection data in real-time anytime. Alternatively, in another practical embodiment, the in-car gas detector 1b is a mobile device, such as a mobile phone, which can be carried by a user (not shown). Therefore, when the user carrying the mobile device sits in the interior space of the car, the mobile device can detect the air pollution condition of the interior space of the car and transmit the in-car gas detection data in real-time anytime, and record and display the data of the polluted gas in the interior space of the car. Hence, in the case that the in-car gas detector 1b is a portable detection device, the communication device 14 of the gas detection module of the in-car gas detector 1b is a wireless communication device.

Please refer to FIG. 4A to FIG. 6. The gas detection main body 12 includes a base 121, a piezoelectric actuator 122, a driving circuit board 123, a laser component 124, a particulate sensor 125, a gas sensor 127, and an outer cap 126.

The base 121 has a first surface 1211, a second surface 1212, a laser configuration region 1213, a gas inlet groove 1214, a gas-guiding component loading region 1215, and a gas outlet groove 1216. The first surface 1211 and the second surface 1212 are opposite to each other. The laser configuration region 1213 hollowed out from the first surface 1211 to the second surface 1212. The outer cap 126 covers the base 121 and has a side plate 1261. The side plate 1261 has a gas inlet opening 1261a and a gas outlet opening 1261b. The gas inlet groove 1214 is recessed from the second surface 1212 and located adjacent to the laser configuration region 1213. The gas inlet groove 1214 has a gas inlet through hole 1214a and two lateral walls. The gas inlet through hole 1214a is in communication with outside of the base 121 and corresponds to the gas inlet opening 1261a of the outer cap 126. Two light permissive windows 1214b penetrate the two lateral walls of the gas inlet groove 1214 and are in communication with the laser configuration region 1213. Therefore, the first surface 1211 of the base 121 is covered by the outer cap 126, and the second surface 1212 of the base 121 is covered by the driving circuit board 123, so as to defines a gas inlet path with the gas inlet groove 1214.

The gas-guiding component loading region 1215 is recessed from the second surface 1212 and in communication with the gas inlet groove 1214. A gas flowing hole 1215a penetrates a bottom surface of the gas-guiding component loading region 1215. Each of four corners of the gas-guiding component loading region 1215 has a positioning bump 1215b. The gas outlet groove 1216 has a gas outlet through hole 1216a, and the gas outlet through hole 1216a is corresponding to the gas outlet opening 1261b of the outer cap 126. The gas outlet groove 1216 includes a first region 1216b and a second region 1216c. The first region 1216b is recessed from a portion of the first surface 1211 corresponding to a vertical projection region of the gas-guiding component loading region 1215. The second region 1216c is at a portion extending from a portion not corresponding to the vertical projection region of the gas-guiding component loading region 1215, and the second region 1216c is hollowed out from the first surface 1211 to the second surface 1212 in a region where the first surface 1211 is not aligned with the gas-guiding component loading region 1215. The first region 1216b is connected to the second region 1216c to form a stepped structure. Moreover, the first region 1216b of the gas outlet groove 1216 is in communication with the gas flowing hole 1215a of the gas-guiding component loading region 1215, and the second region 1216c of the gas outlet groove 1216 is in communication with the gas outlet through hole 1216a. Therefore, when the first surface 1211 of the base 121 is covered by the outer cap 126 and the second surface 1212 of the base 121 is covered by the driving circuit board 123, the gas outlet groove 1216, the base 121, and the driving circuit board 123 together define a gas outlet path.

The laser component 124 and the particulate sensor 125, and the gas sensor 127 are disposed on and electrically connected to the driving circuit board 43 and located in the base 121. Here, in order to clearly explain the positions of the laser component 124, the particulate sensor 125, the gas sensor 127, and the base 121, the driving circuit board 123 is not illustrated in FIG. 6. The laser component 124 is received in the laser configuration region 1213 of the base 121. The particulate sensor 125 is received in the gas inlet groove 1214 of the base 121 and aligned with the laser component 124. Moreover, the laser component 124 corresponds to the light permissive windows 1214b. The light permissive windows 1214b allow the light beam emitted by the laser component 124 to pass therethrough, so that the light beam may further enter into the gas inlet groove 1214. The path of the light beam emitted by the laser component 124 passes through the light permissive windows 1214b and is orthogonal to the gas inlet groove 1214. The light beam emitted by the laser component 124 enters into the gas inlet groove 1214 through the light permissive windows 1214b, and the particulate matters in the gas in the gas inlet groove 1214 is illuminated by the light beam. When the light beam encounters the particulate matters, the light beam will be scattered to generate light spots. Hence, the particulate sensor 125 receives and calculates the light spots generated by the scattering, such that the particulate sensor 125 can obtain the detection data of the gas. The particulate sensor 125 is capable of detecting information in regard to particulate matters (PM1, PM2.5, PM10). The gas sensor 127 is disposed on and electrically connected to the driving circuit board 123, and is received in the gas outlet groove 1216 for detecting the gas introduced into the gas outlet groove 1216. In one embodiment of the present disclosure, the gas sensor 127 includes at least one selected from the group consisting of a volatile organic compound detector capable of detecting gas information of carbon dioxide ($CO_2$) or total volatile organic compounds (TVOC), a formaldehyde sensor capable of detecting gas information of formaldehyde (HCHO) gas, a bacterial sensor capable of detecting information of bacteria or fungi, and a virus sensor capable of detecting information of viruses.

Please refer to FIG. 8A to FIG. 9C. The piezoelectric actuator 122 includes a nozzle plate 1221, a chamber frame 1222, an actuation body 1223, an insulation frame 1224, and a conductive frame 1225. The nozzle plate 1221 is made of a flexible material and has a suspension sheet 1221a and a hollow hole 1221b. The suspension sheet 1221a is a flexible sheet which can bend and vibrate. The shape and the size of the suspension sheet 1221a approximately correspond to those of the inner edge of the gas-guiding component loading region 1215. The hollow hole 1221b penetrates through the center portion of the suspension sheet 1221a for allowing the gas flowing therethrough. In one embodiment, the shape of the suspension sheet 1221a may be one of square, circle, ellipse, triangle, and polygon, but embodiments are not limited thereto. The chamber frame 1222 is stacked on the nozzle plate 1221, and the shape of the chamber frame 1222 is corresponding to the shape of the nozzle plate 1221. The actuation body 1223 is stacked on the chamber frame 1222. A resonance chamber 1226 is defined between the actuation body 1223, the nozzle plate 1221, and the suspension sheet 1221a. The insulation frame 1224 is stacked on the actuation body 1223. The appearance of the insulation frame 1224 is similar to the chamber frame 1222. The conductive frame 1225 is stacked on the insulation frame 1224. The appearance of the conductive frame 1225 is similar to the insulation frame 1224. The conductive frame 1225 has a conductive frame pin 1225a and a conductive electrode 1225b. The conductive frame pin 1225a extends outwardly from the outer edge of the conductive frame 1225, and the conductive electrode 1225b extends inwardly from the inner edge of the conductive frame 1225. Moreover, the actuation body 1223 further includes a piezoelectric carrier plate 1223a, an adjusting resonance plate 1223b, and a piezoelectric plate 1223c. The piezoelectric carrier plate 1223a is stacked on the chamber frame 1222. The adjusting resonance plate 1223b is stacked on the piezoelectric carrier plate 1223a. The piezoelectric plate 1223c is stacked on the adjusting resonance plate 1223b. The adjusting resonance plate 1223b and the piezoelectric plate 1223c are accommodated in the insulation frame 1224. The conductive electrode 1225b of the conductive frame 1225 is electrically connected to the piezoelectric plate 1223c. In one embodiment, the piezoelectric carrier plate 1223a and the adjusting resonance plate 1223b are both made of the same conductive material or different conductive materials. The piezoelectric carrier plate 1223a has a piezoelectric pin 1223d. The piezoelectric pin 1223d and the conductive frame pin 1225a are in electrical connection with a driving circuit (not shown) of the driving circuit board 123 so as to receive a driving signal (which may be a driving frequency and a driving voltage). The piezoelectric pin 1223d, the piezoelectric carrier plate 1223a, the adjusting resonance plate 1223b, the piezoelectric plate 1223c, the conductive electrode 1225b, the conductive frame 1225, and the conductive frame pin 1225a may together form a circuit for transmitting the driving signal, and the insulation frame 1224 is provided for electrically isolating the conductive frame 1225 from the actuation body 1223 for avoiding short circuit, thereby the driving signal can be transmitted to the piezoelectric plate 1223c. When the piezoelectric plate 1223c receives the driving signal, the piezoelectric plate 1223c deforms owing to the piezoelectric effect, and thus the piezoelectric carrier plate 1223a and the adjusting resonance plate 1223b are driven to perform reciprocating vibration correspondingly.

Moreover, the adjusting resonance plate 12323b is disposed between the piezoelectric plate 1233c and the piezoelectric carrier plate 1223a as a cushion element so as to adjust the vibration frequency of the piezoelectric carrier plate 1223a. Generally, the thickness of the adjusting resonance plate 1223b is greater than the thickness of the piezoelectric carrier plate 1223a. The thickness of the adjusting resonance plate 1223b may be changed to adjust the vibration frequency of the actuation body 1223.

Please refer to FIG. 7A, FIG. 7B, FIG. 8A, FIG. 8B, and FIG. 9A. The nozzle plate 1221, the chamber frame 1222, the actuation body 1223, the insulation frame 1224, and the conductive frame 1225 are sequentially stacked and assembled, so as to provide a piezoelectric actuator 122 placed and positioned in the square gas-guiding component loading region 1215 on the base 121 which is supported by and positioned with the positioning bumps 1215b, so that a clearance 1221c is defined outside and around the piezoelectric actuator 122 for gas flow therethrough. In other words, the clearance 1221c is defined between the suspension sheet 1221a of the piezoelectric actuator 122 and the inner edge of the gas-guiding component loading region 1215 for the gas to pass therethrough. The resonance chamber 1226 is formed between the actuation body 12223, the chamber frame 422, and the suspension sheet 1221a. A gas flow chamber 1227 is formed between a bottom of the nozzle plate 1221 and the bottom surface of the gas-guiding component loading region 1215. The gas flow chamber 1227 is in communication with, through the hollow hole 1221b of the nozzle plate 1221, the resonance chamber 1226 formed between the actuation body 1223, the nozzle plate 1221, and the suspension sheet 1221a. Through controlling the vibration frequency of the gas in the resonance chamber 1226 and making the vibration frequency of the gas in the resonance chamber 1226 nearly the same with the vibration frequency of the suspension sheet 1221a, the resonance chamber 1226 and the suspension sheet 1221a can generate the Helmholtz resonance effect so as to improve the gas transmission efficiency.

Figure 9A:
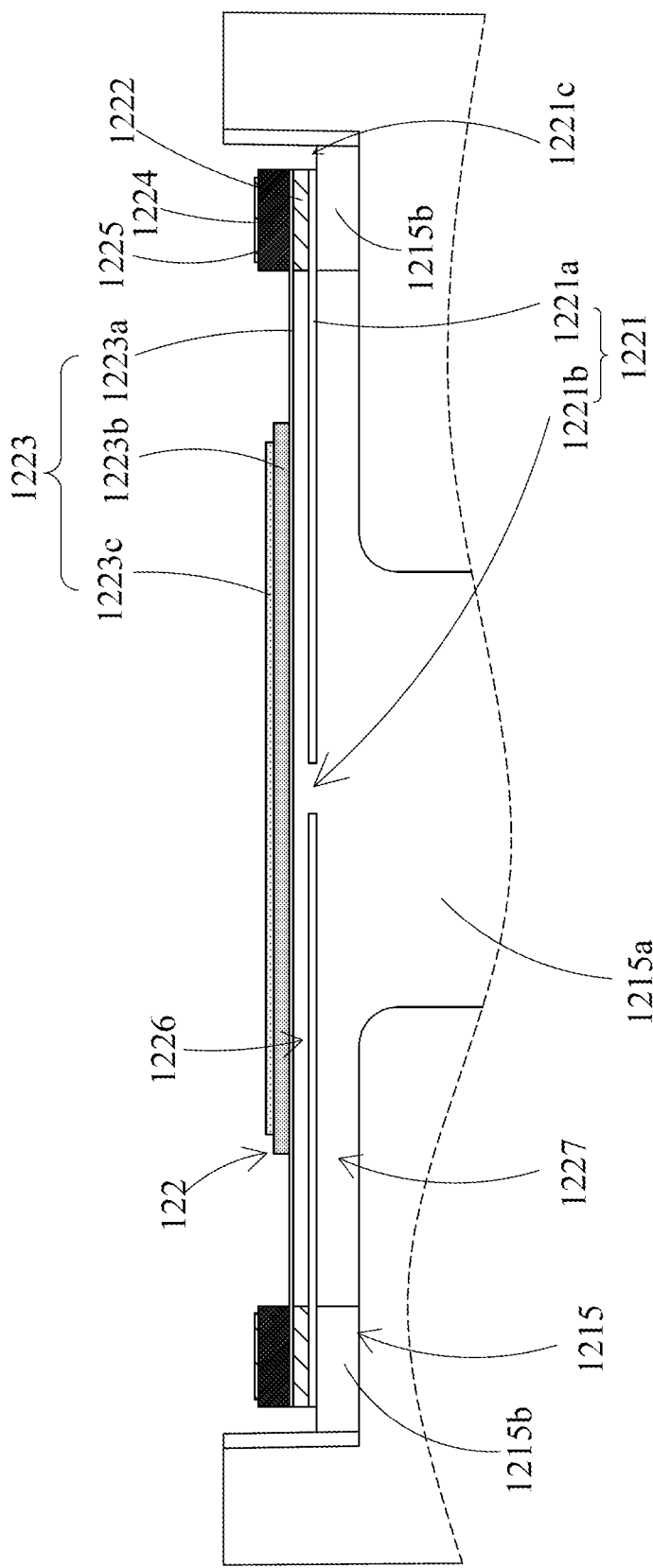
FIG. 9A to FIG. 9C illustrates cross-sectional views of the piezoelectric actuator according to the exemplary embodiment of the present disclosure.
Figure 9B:
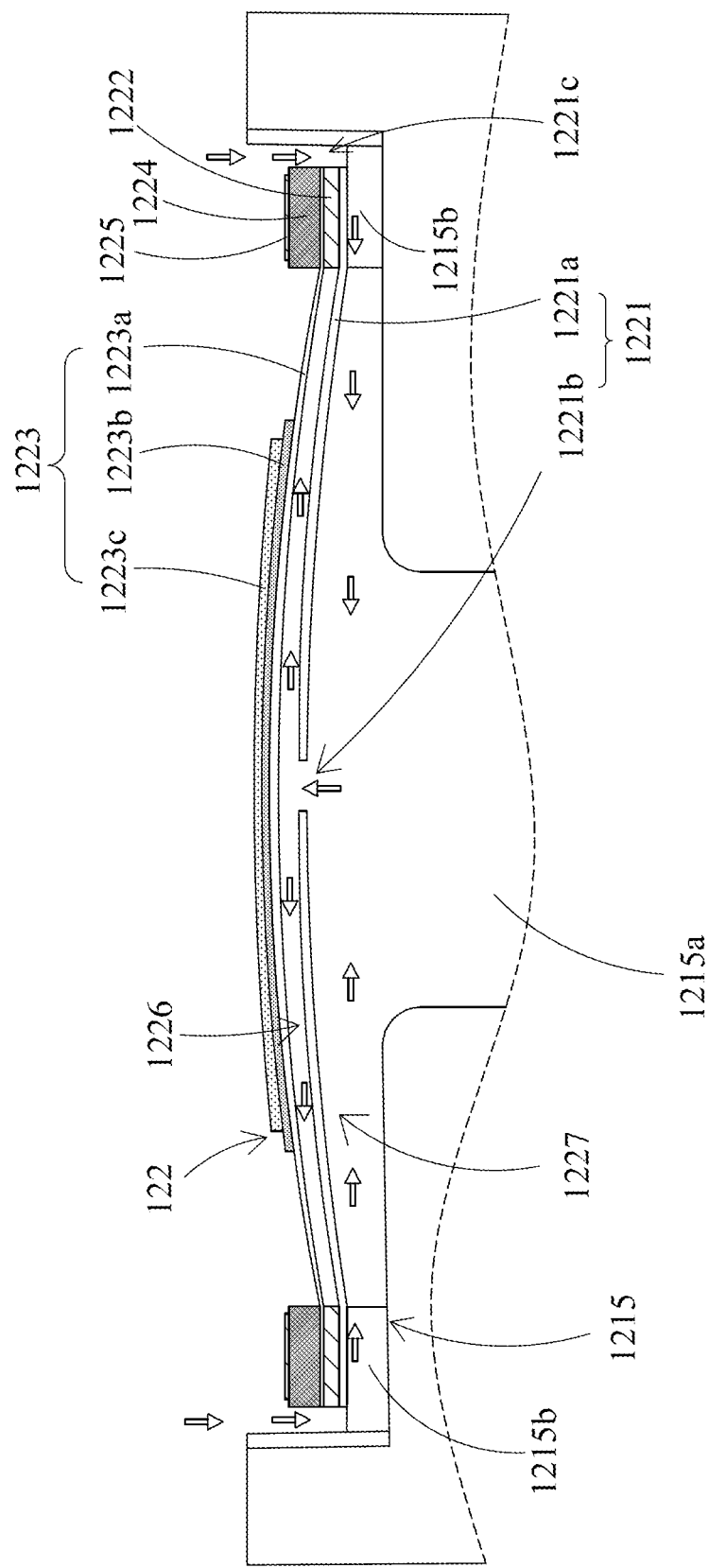

Please refer to FIG. 9B. When the piezoelectric plate 1223c moves in a direction away from the bottom surface of the gas-guiding component loading region 1215, the piezoelectric plate 1223c drives the suspension sheet 1221a of the nozzle plate 1221 to move in the direction away from the bottom surface of the gas-guiding component loading region 1215 correspondingly. Hence, the volume of the gas flow chamber 1227 expands dramatically, so that the internal pressure of the gas flow chamber 1227 decreases and creates a negative pressure, thereby drawing the gas outside the piezoelectric actuator 122 to flow into the piezoelectric actuator 122 through the surrounding gap 1221c and enter into the resonance chamber 1226 through the hollow hole 1221b, thereby increasing the gas pressure of the resonance chamber 1226 and thus generating a pressure gradient.

Figure 9C:
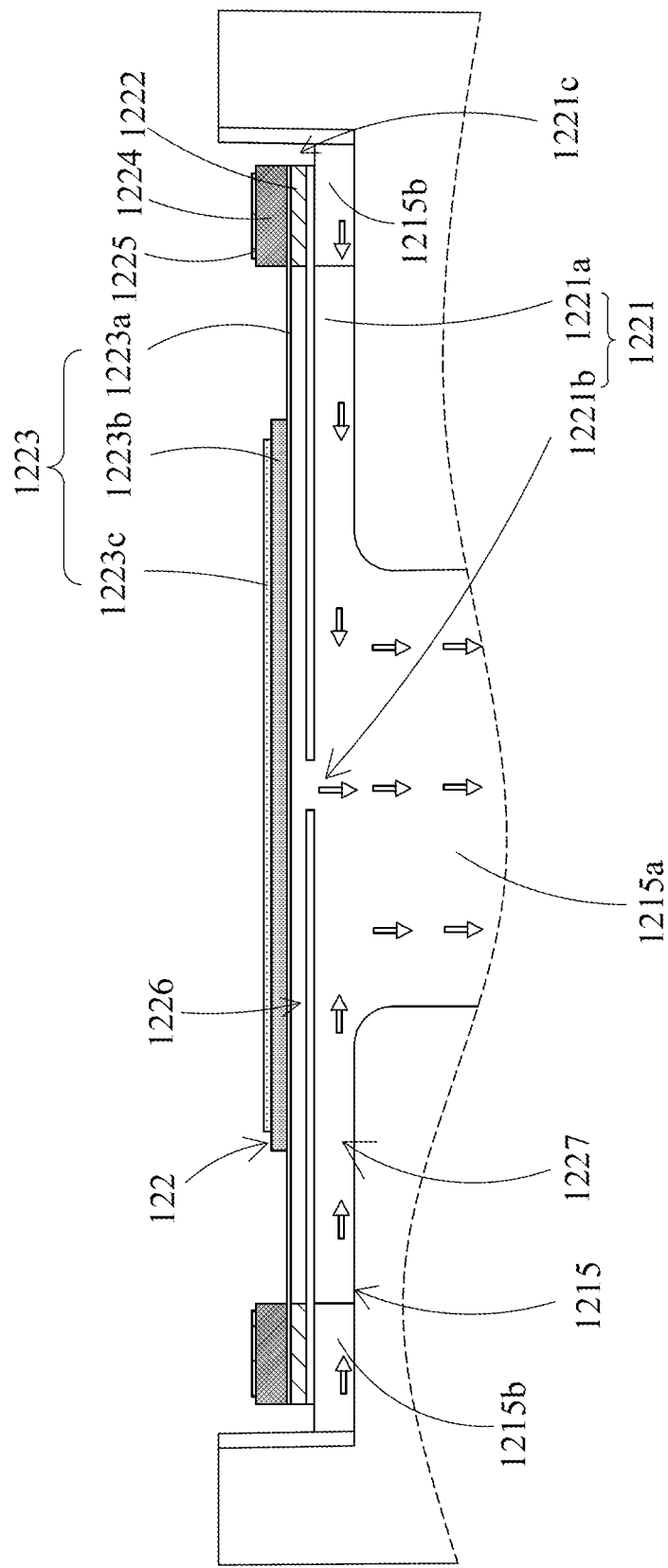

Further, as shown in FIG. 9C, when the piezoelectric plate 1223c drives the suspension sheet 1221a of the nozzle plate 1221 to move toward the bottom surface of the gas-guiding component loading region 1215, the gas inside the resonance chamber 1226 is pushed to flow out quickly through the hollow hole 1221b so as to further push the gas inside the gas flow chamber 1227, thereby the converged gas can be quickly and massively ejected out of the gas flow chamber 1227 and introduced into the gas flowing hole 1215a of the gas-guiding loading region 121 in a state closing to an ideal gas state under the Benulli's law.

The gas-guiding component loading region 1215 of the base 121 is in communication with the gas inlet groove 1214, and the piezoelectric actuator 122 is received in the square gas-guiding component loading region 1215 of the base 121. The driving circuit board 123 is covered on the second surface 121 of the base 121. The laser component 124 is disposed on and electrically connected to the driving circuit board 123. The particulate sensor 125 is also disposed on and electrically connected to the driving circuit board 123. The outer cap 126 covers the base 121, the gas inlet opening 1216a is corresponding to the gas inlet through hole 1214a of the base 121, and the gas outlet opening 1216b is corresponding to the gas outlet through hole 1216a of the base 121. Therefore, through repeating the steps as shown in FIG. 9B and FIG. 9C, the piezoelectric plate 1223c can bend and vibrate reciprocatingly. Further, after the gas is discharged out of the resonance chamber 1226, the internal pressure of the resonance chamber 1226 is lower than the equilibrium pressure due to the inertia, thereby guiding the gas outside the resonance chamber 1226 into the resonance chamber 1226 again. Thus, through controlling the vibration frequency of the gas inside the resonance chamber 1226 to be nearly the same with the vibration frequency of the piezoelectric plate 1226 to generate the Helmholtz resonance effect, high-speed and large-volume gas transmission can be achieved.

Figure 10A:
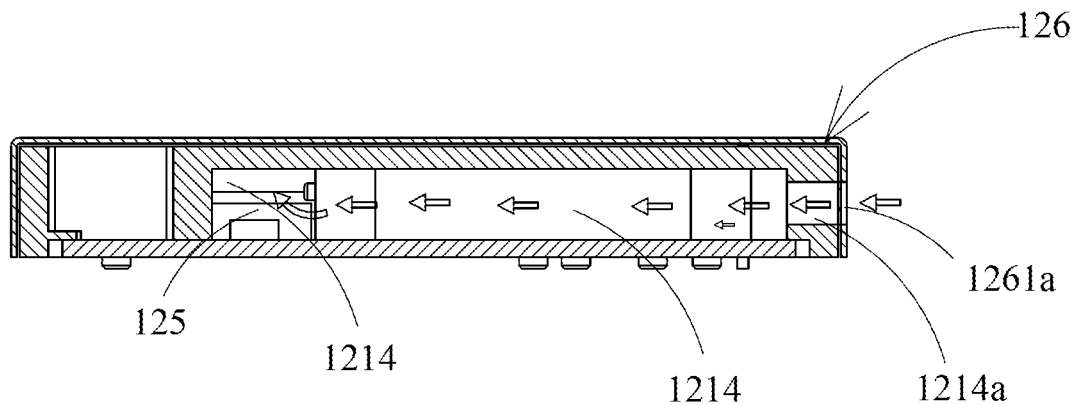
FIG. 10A illustrates a cross-sectional view of the gas detection main body according to one embodiment of the present disclosure.
Figure 10B:
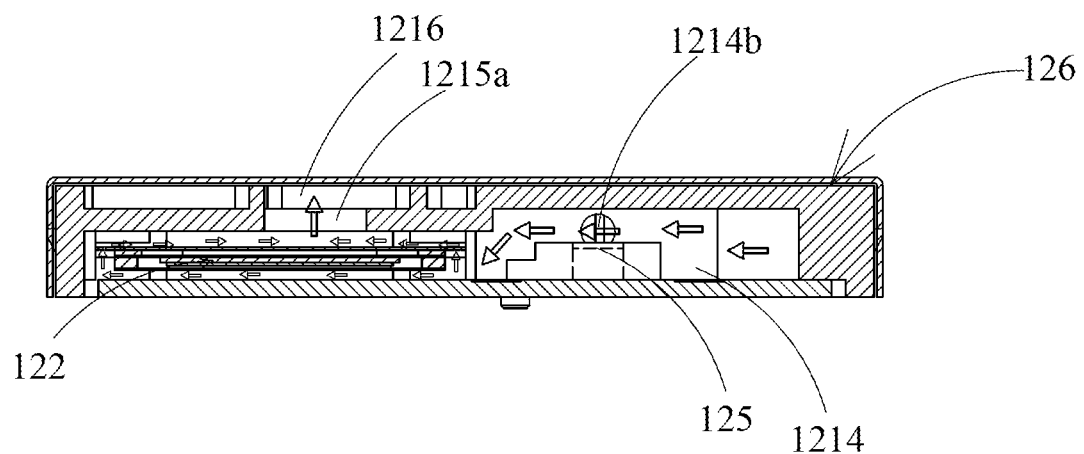
FIG. 10B illustrates a cross-sectional view of the gas detection main body according to another embodiment of the present disclosure.
Figure 10C:
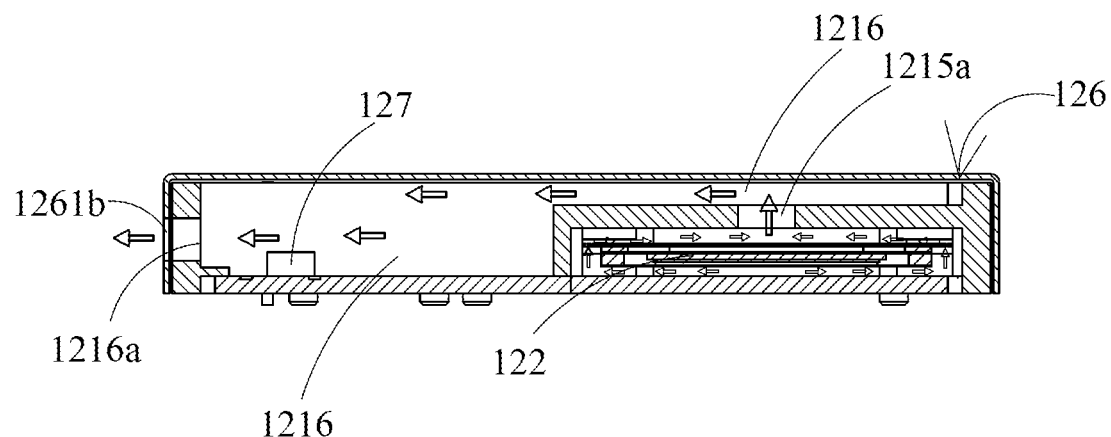
FIG. 10C illustrates a cross-sectional view of the gas detection main body according to one further embodiment of the present disclosure.

Moreover, as shown in FIG. 10A, the gas enters into the gas detection main body from the gas inlet opening 1214a of the outer cap 126, passes through the gas inlet through hole 1214a and enters into the gas inlet path defined by the gas inlet groove 1214 of the base 121, and flows to the particulate sensor 125. The piezoelectric actuator 122 continuously draws the gas in the gas inlet path so as to facilitate the gas outside the gas detection main body to be introduced inside quickly and to pass stably through the particulate sensor 125. Further, as shown in FIG. 10B, the light beam emitted by the laser component 124 passes through the light permissive windows 1214b and enters into the gas inlet groove 1214. The suspended particulate matters in the gas in the gas inlet groove 1214 passing over the particulate sensor 125 are illuminated by the light beam. When the illuminated light beam encounters the particulate matters in the gas, the light beam will be scattered to generate light spots. The particulate sensor 125 receives and calculates the light spots generated by the scattering, such that the particulate sensor 125 obtains the information in regard to the particulate size and the concentration of the particulate matters in the gas. Moreover, the gas passing over the particulate sensor 125 is continuously introduced into the gas flowing hole 1215a of the gas-guiding component loading region 1215 by the driving of the piezoelectric actuator 122 and enters into the gas outlet groove 1216. Last, as shown in FIG. 10C, after the gas enters into the gas outlet groove 1216, the gas passes through the gas sensor 127 for detection. Since the piezoelectric actuator 122 continuously delivers the gas into gas outlet groove 1216, the gas in the gas outlet groove 1216 is pushed and eventually discharged out of the gas detection main body through the gas outlet through hole 1216a and the gas outlet opening 1261b.

In one or some embodiments of the present disclosure, the polluted gas outside the out-car gas detector 1a and the in-car gas detector 1b can be drawn through the gas detection module disposed in the out-car gas detector 1a and in the in-car gas detector 1b. Specifically, in this embodiment, the polluted gas is drawn into the gas inlet path defined by the gas inlet groove 1214 from the gas inlet opening 1261a and passes over the particulate sensor 125, so as to detect the particulate concentration of the particulates in the polluted gas. The polluted gas further passes through the piezoelectric actuator 122, enters into the gas outlet path defined by the gas outlet groove 1216 from the gas flowing hole 1215a of the gas-guiding component loading region 1215, passes through the gas sensor 127, and eventually discharged out of the gas detection main body through the gas outlet through hole 1216a and the gas outlet opening 1261b. Therefore, the gas detection module not only can detect the particulate matters in the gas but also can detect the introduced polluted gas including at least one selected from the group consisting of carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, the viruses.

Figure 2C:
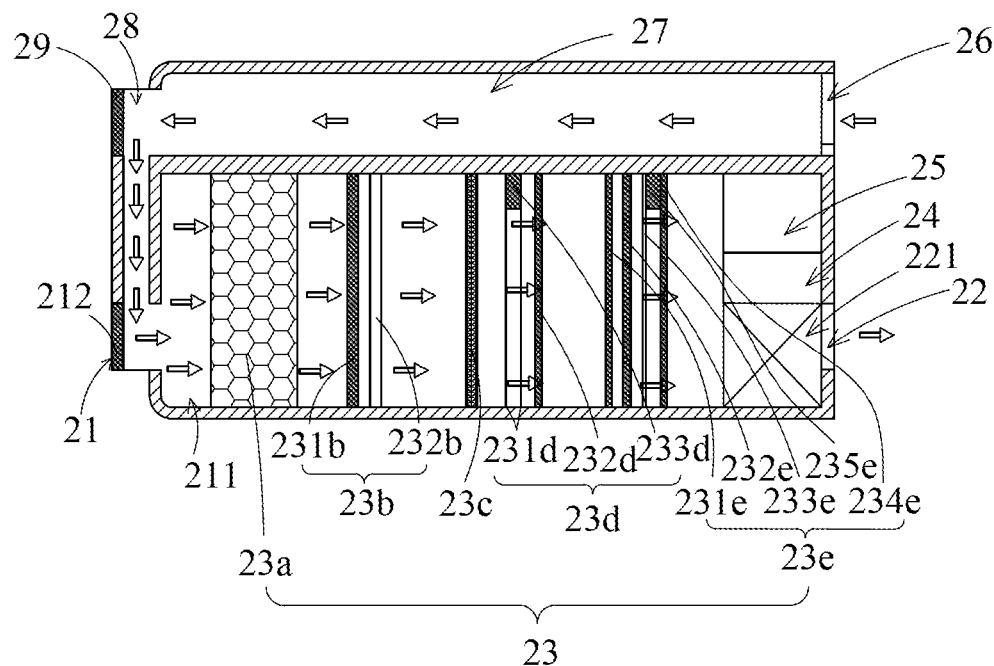
FIG. 2C illustrates a schematic cross-sectional view of the in-car gas exchange system according to one embodiment of the present disclosure.
Figure 2D:
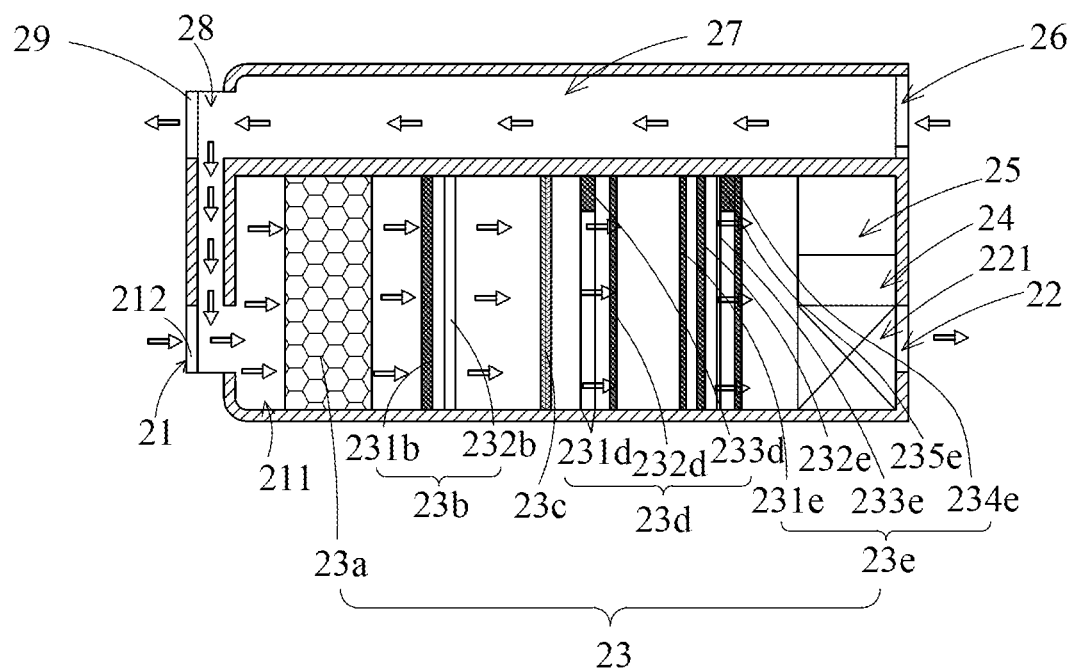
FIG. 2D illustrates a schematic cross-sectional view of an in-car gas exchange system according to another embodiment of the present disclosure.
Figure 11:
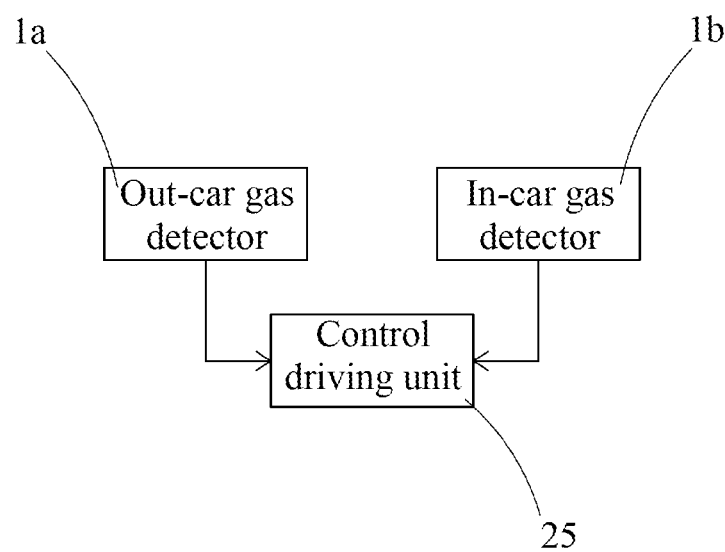
FIG. 11 illustrates a schematic view showing the connection between the out-car gas detector, the in-car gas detector, and the control driving unit.

Further, as shown in FIG. 11, after the control driving unit 25 receives the out-car gas detection data from the out-car gas detector 1a and the in-car gas detection data from the in-car gas detector 1b and identifies that the in-car gas detection data is higher than a safety detection value, as shown in FIG. 2C, the control driving unit 25 selectively closes, in an intelligent manner, both the inlet valve 212 and the outlet valve 29 and enable the flow-guiding component 221 to allow the polluted gas in the interior space of the car to enter into the gas-exchange channel 26 from the gas-exchange inlet 27 and then to be introduced into the inlet channel 211 to form a circulating gas flow path, so that the polluted gas passes through the cleaning unit 23 for filtering and purifying and is introduced into the interior space of the car 101 from the gas outlet 22, thereby allowing the in-car detection data of the polluted gas in the in-car space to decrease to the safety detection value. As shown in FIG. 11, after the control driving unit 25 receives the out-car gas detection data and the in-car gas detection data and identifies that the out-car gas detection data is lower than the in-car gas detection data, as shown in FIG. 2D, the control driving unit 25 opens, in an intelligent manner, both the inlet valve 212 and the outlet valve 29 and enable the flow-guiding component 221 to allow the gas outside the car to be introduced into the inlet channel 211, to pass through the cleaning unit 23 for filtering and purifying, and to be introduced into the interior space of the car from the gas outlet 22. Moreover, after the polluted gas in the interior space of the car enters into the gas-exchange channel 27 from the gas-exchange inlet 26, the polluted gas is discharged outside of car from the gas-exchange outlet 28 at the same time, so that the polluted gas in the interior space of the car can be exchanged out of the car, thereby allowing the in-car detection data of the polluted gas in the in-car space to decrease to the safety detection value.

Figure 2E:
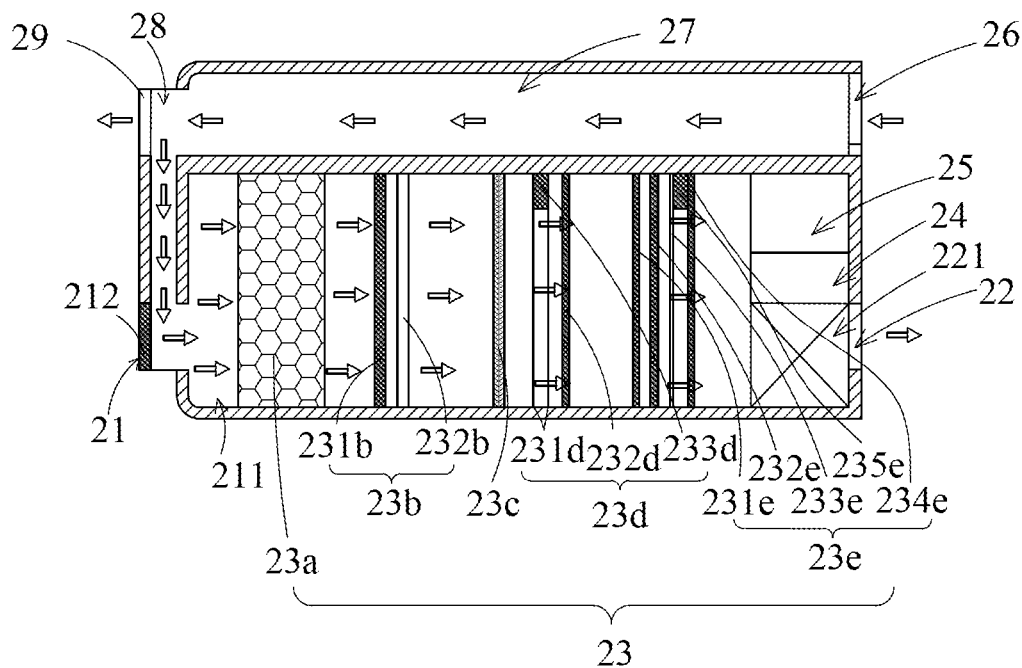
FIG. 2E illustrates a schematic cross-sectional view of an in-car gas exchange system according to one further embodiment of the present disclosure.

As shown in FIG. 11, after the control driving unit 25 receives the out-car gas detection data and the in-car gas detection data and identifies that the in-car gas detection data is lower than the out-car gas detection data, as shown in FIG. 2E, the control driving unit 25 closes the inlet valve 21 and opens the outlet valve 29, in an intelligent manner, such that the gas outside the car is not introduced into the in-car gas exchange system 2 and the control driving unit 25 enable the flow-guiding component 221 to allow the polluted gas in the interior space of the car to enter into the gas-exchange channel 27 from the gas-exchange inlet 26 and to be discharge out of the car from the gas-exchange outlet 28. At the same time, the polluted gas is also introduced into the inlet channel 211 to form a circulating gas flow path, so that the polluted gas further passes through the cleaning unit 23 for filtering and purifying and is introduced into the interior space of the car from the gas outlet 22, so as to complete the gas exchange for the polluted gas in the interior space of the car, thereby allowing the in-car gas detection data of the polluted gas in the interior space of the car to decrease to a safety detection value.

The safety detection value includes at least one selected from the group consisting of a concentration of PM2.5 which is less than 10 $\mu g/m^3$, a concentration of carbon dioxide which is less than 1000 ppm, a concentration of total volatile organic compounds which is less than 0.56 ppm, a concentration of formaldehyde which is less than 0.08 ppm, a number of bacteria which is less than 1500 $CFU/m^3$, a number of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 35 ppm, a concentration of ozone which is less than 0.12 ppm, and a concentration of lead which is less than 0.15 $\mu g/m^3$.

Further, as shown in FIG. 2C, the cleaning unit 23 may be the combination of various embodiments. In one embodiment, the cleaning unit 23 is a high-efficiency particulate air (HEPA) filter 23a. The polluted gas is introduced from the inlet channel 211, and the chemical smog, bacteria, dusts, particulates, and pollens contained in the polluted gas are absorbed by the high-efficiency particulate air filter 2a to provide a filtering and purifying function for the gas guiding therethrough. In some embodiments, a cleansing factor layer having chlorine dioxide is coated on the high-efficiency particulate air filter 23a for suppressing viruses and bacteria in the polluted gas introduced from the inlet channel 211. Alternatively, in some other embodiments, a herbal protection coating layer including the extracts of *Rhus chinensis* Mill (may be *Rhus chinensis* Mill from Japan) and the extracts of *Ginkgo biloba* may be coated on the high-efficiency particulate air filter 23a to form a herbal protection anti-allergy filter which can efficiently perform anti-allergy function and destroy cell surface proteins of influenza viruses in the polluted gas which is introduced from the inlet channel 211 and passing through the herbal protection anti-allergy filter. Alternatively, in some other embodiments, a layer of silver ions may be coated on the high-efficiency particulate air filter 23a for suppressing viruses and bacteria in the polluted gas introduced from the inlet channel 211.

In another embodiment, the cleaning unit 23 may be a combination of the high-efficiency particulate air filter 23a and a photocatalyst unit 23b. The photocatalyst unit 23b includes a photocatalyst 231b and an ultraviolet light 232b. The photocatalyst 21b is excited under the illumination of the ultraviolet light 22b so as to degrade the pollutants in the polluted gas introduced from the inlet channel 211 for filtering and purifying. The photocatalyst 231b and the ultraviolet light 232b are individually disposed in the inlet channel 211 and spaced apart from each other from a distance. Therefore, the photocatalyst 21b is excited under the illumination of the ultraviolet light 22b to convert the light energy into chemical energy, thereby degrading hazardous matters in the polluted gas introduced from the inlet channel 211 and sterilizing the polluted gas, such that the polluted gas is filtered and purified by the cleaning unit 23.

In another embodiment, the cleaning unit 23 may be a combination of the high-efficiency particulate air filter 23a and a photo plasma unit 23c. The photo plasma unit 23c is a nanometer light tube. Through illuminating the polluted gas introduced from the inlet channel 211 with the light irradiated from the nanometer light tube, the volatile organic gases contained in the polluted gas can be degraded and purified. The nanometer light tube is disposed in the inlet channel 211. The polluted gas introduced from the inlet channel 211 is illuminated by the light irradiated from the nanometer optical tube, so that the oxygen molecules and water molecules in the polluted gas are degraded into high oxidative photo plasma, thereby forming a plasma stream capable of destroying organic molecules. Accordingly, volatile organic compounds (VOC) such as formaldehyde and toluene in the polluted gas can be degraded into water and carbon dioxide. Thus, the polluted gas can be filtered and purified by the cleaning unit 23.

In another embodiment, the cleaning unit 23 may be a combination of the high-efficiency particulate air filter 23a and a negative ion unit 23d. The negative ion unit 23d includes at least one electrode wire 231d, at least one dust-collecting plate 232d, and a boost power supply 233d. Through high voltage discharging of the electrode wire 231d, the particulates contained in the polluted gas introduced from the inlet channel 211 are adhered to the dust-collecting plate 232d for being filtered and purified. The electrode wire 231d and the dust-collecting plate 232d are disposed in the inlet channel 211. The boost power supply 233d provides the electrode wire 231d with high voltage electricity, so as to allow the dust-collecting plate 232d to carry with negative charges thereon. Therefore, the particulates carry with positive charges in the polluted gas introduced from the inlet channel 211 are adhered on the dust-collecting plate 232d carry with negative charges by high voltage discharging of the electrode wire 231d. Accordingly, the polluted gas is filtered and purified by the cleaning unit 23.

In another embodiment, the cleaning unit 23 may be a combination of the high-efficiency particulate air filter 23a and a plasma ion unit 23e. The plasma ion unit 23e includes a first electric-field protection mesh 231e, an absorbing mesh 232e, a high-voltage discharge electrode 233e, a second electric-field protection mesh 234e, and a boost power supply 235e. The boost power supply 235e provides the high-voltage discharge electrode 233e with a high voltage so as to generate a high-voltage plasma column. Therefore, the viruses and the bacteria in the polluted gas introduced from the inlet channel 211 are degraded by the high-voltage plasma column. The first electric-field protection mesh 231e, the absorbing mesh 232e, the high-voltage discharge electrode 233e, and the second electric-field protection mesh 234e are disposed in the inlet channel 211, and the absorbing mesh 232e and the high-voltage discharge electrode 233e are located between the first electric-field protection mesh 231e and the second electric-field protection mesh 234e. The high-voltage discharge electrode 233e is provided with a high voltage by the boost power supply 235e to generate a high-voltage plasma column. Therefore, the oxygen molecules and the water molecules in the polluted gas introduced from the inlet channel 211 are ionized to form cations ($H^+$) and anions ($O_2^-$). The substances attached with water molecules around the ions are attached on the surfaces of viruses and bacteria, and converted the water molecules into oxidative oxygen ions (hydroxyl ions, $OH^-$ ions), and the oxidative oxygen ions take away the hydrogen ions of the proteins on the surfaces of the viruses and the bacteria to degrade the viruses and the bacteria. Accordingly, the polluted gas is filtered and purified by the cleaning unit 23.

To sum up, one or some embodiments of the present disclosure provides a method for preventing and handling in-car air pollution which includes providing an out-car gas detector and an in-car gas detector to output an out-car gas detection data and an in-car gas detection data through the gas detection modules in the detectors; and providing an in-car gas exchange system. The in-car gas exchange system provides an air-conditioning unit, a cleaning unit, and a control driving unit. The air-conditioning unit adjusts the temperature and the humidity of the interior space of the car. The cleaning unit introduces, filters, and purifies the gas as well as introducing the processed gas into the interior space of the car. The control driving unit receives the out-car gas detection data and the in-car gas detection data and compares the out-car gas detection data with the in-car gas detection data, so as to allow the control driving unit to provide an artificial intelligent computation and comparison to selectively control the gas exchange for the polluted gas in the interior space of the car or to selectively determine whether to introduce the gas outside the car into the interior space of the car to exchange with the polluted gas, such that the polluted gas in the interior space of the car is exchanged to be a clean, safe, and breathable gas. Accordingly, a method for preventing and handling in-car air pollution is provided.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for preventing and handling in-car air pollution, applicable for dealing with air pollutant by gas exchanging and filtering of a polluted gas in an interior space of a car, wherein the method comprises:
   providing an out-car gas detector to detect a polluted gas outside the car and transmit an out-car gas detection data;
   providing an in-car gas detector to detect the polluted gas in the interior space of the car and transmit an in-car gas detection data;
   providing an in-car gas exchange system for controlling and determining if it is needed to introduce a gas outside the car into the interior space of the car, wherein the in-car gas exchange system comprises a cleaning unit and a control driving circuit; the cleaning unit is provided for filtering and purifying the polluted gas in the interior space of the car, and the control driving circuit receives the out-car gas detection data and the in-car gas detection data and compares the out-car gas detection data with the in-car gas detection data; and
   providing an intelligent selection conducted by the control driving circuit for introducing the gas outside the car by the in-car gas exchange system after the control driving circuit compares the out-car gas detection data with the in-car gas detection data;
   wherein the in-car gas exchange system has at least one gas inlet and at least one gas outlet the gas outside the car enters into the in-car gas exchange system through the at least one gas inlet and passes through the cleaning unit for filtering and purifying, and then the gas is introduced into the interior space of the car through the at least one gas outlet;
   the at least one gas inlet is connected to an inlet channel and comprises an inlet valve for opening or closing the at least one gas inlet; the in-car gas exchange system further comprises a gas-exchange inlet, a gas-exchange channel, and a gas-exchange outlet; the gas-exchange inlet is connected to the gas-exchange channel, the gas-exchange channel is in communication with the gas-exchange outlet and the inlet channel; the gas-exchange outlet comprises an outlet valve for opening or closing the gas-exchange outlet; and
   the polluted gas in the interior space of the car leaving from the outlet valve does not pass through the at least one gas outlet.

2. The method for preventing and handling in-car air pollution according to claim 1, wherein the polluted gas in the interior space or the polluted gas outside the car comprises at least one selected from the group consisting of particulate matters, carbon monoxide, carbon dioxide, ozone, sulfur dioxide, nitrogen dioxide, lead, total volatile organic compounds, formaldehyde, bacteria, fungi, and viruses.

3. The method for preventing and handling in-car air pollution according to claim 1, wherein the in-car gas exchange system further comprises an air-conditioning unit disposed in the inlet channel; the air-conditioning unit is adapted to adjust a temperature and a humidity of the gas introduced from the inlet channel, and the gas introduced from the inlet channel is introduced into the interior space of the car through the gas outlet.

4. The method for preventing and handling in-car air pollution according to claim 1, wherein the in-car gas detector is a wearable device capable of being worn on a human or is a mobile device capable of being carried by the human to instantly detect the polluted gas in the interior space of the car and wirelessly transmitting the in-car gas detection data.

5. The method for preventing and handling in-car air pollution according to claim 1, wherein a safety detection value is preset and stored in the control driving circuit.

6. The method for preventing and handling in-car air pollution according to claim 5, wherein the control driving unit identifies that the in-car gas detection data is higher than the safety detection value, then the control driving circuit intelligently selects to close both the inlet valve and the outlet valve, and the polluted gas in the interior space of the car is allowed to enter into the gas-exchange channel from the gas-exchange inlet and then introduce into the inlet channel to form a circulating gas flow path.

7. The method for preventing and handling in-car air pollution according to claim 5, wherein the control driving circuit identifies that the out-car gas detection data is lower than in-car gas detection data, then the control driving circuit intelligently selects to open both the inlet valve and the outlet valve, and the gas outside the car is allowed to be introduced into inlet channel, to pass through the cleaning unit for filtering and purifying, and then guided into the interior space of the car from the gas outlet; and the polluted gas is discharged out of the car from the gas-exchange outlet after the polluted gas in the interior space of the car enters into the gas-exchange channel from the gas-exchange inlet.

8. The method for preventing and handling in-car air pollution according to claim 5, wherein the control driving circuit identifies that the in-car gas detection data is lower than the out-car gas detection data, then the control driving circuit intelligently selects to close the inlet valve and open the outlet valve so as not to introduce the gas outside the car into the in-car gas exchange system, and the polluted gas in the interior space of the car is allowed to enter into the gas-exchange channel from the gas-exchange inlet, to be discharged out of the car from the gas-exchange outlet, and to be introduced into the inlet channel to form a circulating gas flow path.

9. The method for preventing and handling in-car air pollution according to claim 5, wherein the safety detection value comprises at least one selected from the group consisting of a concentration of PM2.5 is less than 10 $\mu g/m^3$, a concentration of carbon dioxide is less than 1000 ppm, a concentration of total volatile organic compounds is less than 0.56 ppm, a concentration of formaldehyde is less than 0.08 ppm, a number of bacteria is less than 1500 $CFU/m^3$, a number of fungi is less than 1000 $CFU/m^3$, a concentration of sulfur dioxide is less than 0.075 ppm, a concentration of nitrogen dioxide is less than 0.1 ppm, a concentration of carbon monoxide is less than 35 ppm, a concentration of ozone is less than 0.12 ppm, and a concentration of lead is less than 0.15 $\mu g/m^3$.

10. The method for preventing and handling in-car air pollution according to claim 1, wherein each of the out-car gas detector and the in-car gas detector comprises a gas detection module; the gas detection module comprises a control circuit board, a gas detection main body, a microprocessor, and a communication device; the gas detection main body, the microprocessor, and the communication device are integrally packaged with and electrically connected to the control circuit board; the microprocessor controls an operation of the gas detection main body to output a detection signal as the gas detection main body detects the polluted gash the microprocessor of the gas detection module of the out-car gas detector receives and processes the detection signal to output the out-car gas detection data, and the microprocessor of the gas detection module of the in-car gas detector receives and processes the detection signal to output the in-car gas detection data, so that the microprocessor of the gas detection module of the out-car gas detector and the microprocessor of the gas detection module of the in-car gas detector respectively provide the out-car gas detection data and the in-car gas detection data to their communication devices for transmitting outwardly.

11. The method for preventing and handling in-car air pollution according to claim 10, wherein the gas detection main body each comprises:
    a base, having:
        a first surface;
        a second surface opposite to the first surface;
        a laser configuration region hollowed out from the first surface to the second surface;
        a gas inlet groove recessed from the second surface and located adjacent to the laser configuration region, wherein the gas inlet groove has a gas inlet through hole and two lateral walls; two light permissive windows penetrate the two lateral walls of the gas inlet groove and in communication with the laser configuration region;
        a gas-guiding component loading region recessed from the second surface and in communication with the gas inlet groove, wherein a gas flowing hole penetrates a bottom surface of the gas-guiding component loading region; and
        a gas outlet groove recessed from a portion of the first surface corresponding to the bottom surface of the gas-guiding component loading region, and hollowed out from the first surface to the second surface in a region where the first surface is not aligned with the gas-guiding component loading region, wherein the gas outlet groove is in communication with the gas flowing hole and has a gas outlet through hole;
    a piezoelectric actuator received in the gas-guiding component loading region;
    a driving circuit board attached to the second surface of the base;
    a laser component disposed on and electrically connected to the driving circuit board, wherein the laser component is received in the laser configuration region, and a path of a light beam emitted by the laser component passes through the light permissive windows and is orthogonal to the gas inlet groove;
    a particulate sensor disposed on and electrically connected to the driving circuit board, wherein the particulate sensor is received in a portion of the gas inlet groove where the path of the light beam emitted by the laser component is orthogonal thereto, so that the particulate sensor detects particulates in the polluted gas passing through the gas inlet groove that is illuminated by the light beam of the laser component;

a gas sensor disposed on and electrically connected to the driving circuit board, wherein the gas sensor is received in the gas outlet groove, so that the gas sensor detects the polluted gas introduced into the gas outlet groove; and an outer cap covering the base and having a side plate, and the side plate has a gas inlet opening and a gas outlet opening, the gas inlet opening is corresponding to the gas inlet through hole of the base, and the gas outlet opening is corresponding to the gas outlet through hole of the base;

wherein the outer cap covers the base, and the driving circuit board is attached to the second surface of the base, so that the gas inlet groove defines a gas inlet path and the gas outlet groove defines a gas outlet path, thereby facilitating the piezoelectric actuator to introduce the polluted gas outside the gas inlet through hole of the base into the gas inlet path defined by the gas inlet groove from the gas inlet opening; the polluted gas passes through the particulate sensor so that the particulate sensor detects a particulate concentration of the particulates in the polluted gas; and the polluted gas is discharged into the gas outlet path defined by the gas outlet groove from the gas flowing hole, and discharged out of the gas detection main body from the gas outlet through hole and the gas outlet opening of the base.

12. The method for preventing and handling in-car air pollution according to claim 11, wherein the particulate sensor is capable of detecting particulate matters.

13. The method for preventing and handling in-car air pollution according to claim 11, wherein the gas sensor comprises a volatile organic compound detector capable of detecting carbon dioxide or total volatile organic compounds.

14. The method for preventing and handling in-car air pollution according to claim 11, wherein the gas sensor comprises at least one selected from the group consisting of a formaldehyde sensor capable of detecting formaldehyde gas, a bacterial sensor capable of detecting bacteria or fungi, and a virus sensor capable of detecting viruses.

15. The method for preventing and handling in-car air pollution according to claim 1, wherein the cleaning unit is disposed in the inlet channel, and the cleaning unit is a high-efficiency particulate air filter.

16. The method for preventing and handling in-car air pollution according to claim 15, wherein the high-efficiency particulate air filter is coated with a cleansing element containing chlorine dioxide for suppressing viruses and bacteria in the polluted gas.

17. The method for preventing and handling in-car air pollution according to claim 16, wherein the high-efficiency particulate air filer is coated with a herbal protection coating layer comprising extracts of *Rhus chinensis* Mill and extracts of Ginkgo biloba to form a herbal protection anti-allergy filter which performs anti-allergy function and destroy cell surface proteins of influenza viruses passing through the herbal protection anti-allergy filter.

18. The method for preventing and handling in-car air pollution according to claim 15, wherein a layer of silver ions is coated on the high-efficiency particulate air filter for suppressing viruses and bacteria in the polluted gas.

19. The method for preventing and handling in-car air pollution according to claim 15, wherein the cleaning unit further comprises at least one selected from the group consisting of a photocatalyst unit, a photo plasma unit, a negative ion unit, and a plasma ion unit.

20. The method for preventing and handling in-car air pollution according to claim 10, wherein the communication device of each of the out-car gas detector and the in-car gas detector is communicationally connected to the control driving circuit of the in-car gas exchange system through a wired transmission, and the wired transmission is achieved by one of a USB port, a mini-USB port, and micro-USB port.

21. The method for preventing and handling in-car air pollution according to claim 10, wherein the communication device of each of the out-car gas detector and the in-car gas detector is communicationally connected to the control driving circuit of the in-car gas exchange system through a wireless transmission, and the wireless transmission achieved by is one of a Wi-Fi module, a Bluetooth module, a radiofrequency identification module, and a near field communication module.

* * * * *